(12) United States Patent
Foreman, Jr.

(10) Patent No.: US 10,996,113 B2
(45) Date of Patent: May 4, 2021

(54) THERMOWELL WITH EXPANSION JOINT

(71) Applicant: Foreman Instrumentation & Controls, Inc., Houston, TX (US)

(72) Inventor: Timothy H. Foreman, Jr., Houston, TX (US)

(73) Assignee: Foreman Instrumentation & Controls, Inc., Houston, TX (US)

( * ) Notice: Subject to any disclaimer, the term of this patent is extended or adjusted under 35 U.S.C. 154(b) by 318 days.

(21) Appl. No.: 16/139,004

(22) Filed: Sep. 22, 2018

(65) Prior Publication Data

US 2019/0101453 A1    Apr. 4, 2019

Related U.S. Application Data

(60) Provisional application No. 62/565,300, filed on Sep. 29, 2017.

(51) Int. Cl.
| | |
|---|---|
| *G01K 1/08* | (2021.01) |
| *G01K 1/14* | (2021.01) |
| *G01K 7/02* | (2021.01) |

(52) U.S. Cl.
CPC .................. *G01K 1/08* (2013.01); *G01K 1/14* (2013.01); *G01K 7/02* (2013.01)

(58) Field of Classification Search
CPC .............. G01K 1/08; G01K 1/14; G01K 7/02
See application file for complete search history.

(56) References Cited

U.S. PATENT DOCUMENTS

| | | | | |
|---|---|---|---|---|
| 2,383,401 | A | * | 8/1945 | Mantz ................... F24H 9/00 236/21 B |
| 3,439,356 | A | * | 4/1969 | Kinzer .................. H01G 13/02 340/626 |
| 3,501,957 | A | | 3/1970 | Jones, Jr. |
| 3,531,993 | A | * | 10/1970 | Karn ..................... G01K 1/14 136/230 |
| 3,589,192 | A | | 6/1971 | Sabovik |
| 3,751,305 | A | | 8/1973 | Huebscher |
| 3,753,787 | A | | 8/1973 | Webb |
| 3,930,892 | A | | 1/1976 | Fox et al. |
| 4,259,123 | A | | 3/1981 | Tymkewicz |
| 4,281,985 | A | * | 8/1981 | Mee ....................... F27B 14/04 266/250 |
| 4,355,912 | A | | 10/1982 | Haak |
| 4,376,227 | A | | 3/1983 | Hiborn |
| 4,558,959 | A | | 12/1985 | Thomas et al. |

(Continued)

FOREIGN PATENT DOCUMENTS

CN    105318977 A    2/2016

*Primary Examiner* — Nathaniel T Woodward
*Assistant Examiner* — Philip L Cotey
(74) *Attorney, Agent, or Firm* — Stephen S. Hodgson

(57) ABSTRACT

A thermowell-thermocouple assembly for installation in a refractory-lined process vessel has an expansion joint for compensating for expansion, contraction and movement of the refractory. Examples of expansion joints include unsupported bellows, bellows that have a support sleeve around the bellows, a sliding, hexagonal coupling with crimping to hold the sliding tubes together, a pin-and-slot coupling and a spring-loaded, pin-and-slot sliding connection. The thermocouple-thermowell assembly can include a metal, a ceramic material, a refractory brick and/or a conical-shaped tip at a distal end, which can be or which can become fixed to the refractory.

37 Claims, 23 Drawing Sheets

(56) References Cited

U.S. PATENT DOCUMENTS

| | | | | |
|---|---|---|---|---|
| 4,588,377 | A | 5/1986 | Kohn et al. | |
| 4,590,326 | A | 5/1986 | Woldy et al. | |
| 4,628,141 | A | 12/1986 | Wieszeck et al. | |
| 4,630,939 | A | 12/1986 | Mayes | |
| 4,653,935 | A * | 3/1987 | Daily | B01J 8/0005 136/221 |
| 4,749,415 | A | 6/1988 | Barton | |
| 4,826,540 | A | 5/1989 | Mele | |
| 4,848,927 | A * | 7/1989 | Daily | B01J 8/0005 374/208 |
| 4,875,782 | A | 10/1989 | Fox | |
| 4,963,194 | A | 10/1990 | Mele | |
| 5,048,323 | A * | 9/1991 | Stansfeld | G01N 9/002 73/32 A |
| 5,185,996 | A * | 2/1993 | Smith | F01D 17/02 374/144 |
| 5,222,517 | A * | 6/1993 | Zink | B61D 5/00 137/347 |
| 5,230,745 | A | 7/1993 | Chretian et al. | |
| 5,399,018 | A | 3/1995 | Hollander et al. | |
| 5,632,557 | A | 5/1997 | Simons | |
| 5,674,009 | A | 10/1997 | Stark | |
| 6,020,552 | A | 2/2000 | Rickman | |
| 6,045,261 | A | 4/2000 | Rossum et al. | |
| 6,220,749 | B1 | 4/2001 | Wyker | |
| 6,227,703 | B1 | 5/2001 | DiMatteo et al. | |
| 6,231,230 | B1 | 5/2001 | Baddock et al. | |
| 6,457,857 | B1 | 10/2002 | Gul | |
| 6,536,950 | B1 | 3/2003 | Green et al. | |
| 6,599,012 | B2 | 7/2003 | Gul | |
| 6,857,776 | B2 | 2/2005 | Park | |
| 7,036,983 | B2 | 5/2006 | Green et al. | |
| 7,153,023 | B2 | 12/2006 | Howard et al. | |
| 7,165,883 | B2 | 1/2007 | Nimberger et al. | |
| 7,465,086 | B1 * | 12/2008 | Foreman, Jr. | G01K 1/08 136/200 |
| 7,581,879 | B2 | 9/2009 | Miyahara et al. | |
| 9,341,522 | B2 | 5/2016 | Kitzman et al. | |
| 9,885,615 | B2 | 2/2018 | Hatlen et al. | |
| 2003/0026742 | A1 | 2/2003 | Wu et al. | |
| 2007/0191575 | A1 * | 8/2007 | Sumner, Jr. | C08G 8/10 528/137 |
| 2007/0258505 | A1 | 11/2007 | Jindal et al. | |
| 2011/0238281 | A1 | 9/2011 | Sparks et al. | |
| 2013/0012028 | A1 * | 1/2013 | Stern | H01L 21/67086 438/753 |
| 2013/0181384 | A1 * | 7/2013 | Smith | F27D 21/0021 266/99 |
| 2013/0186236 | A1 * | 7/2013 | Drouet | F27B 7/16 75/10.35 |
| 2018/0266947 | A1 * | 9/2018 | Coonrod | G01N 21/474 |

* cited by examiner

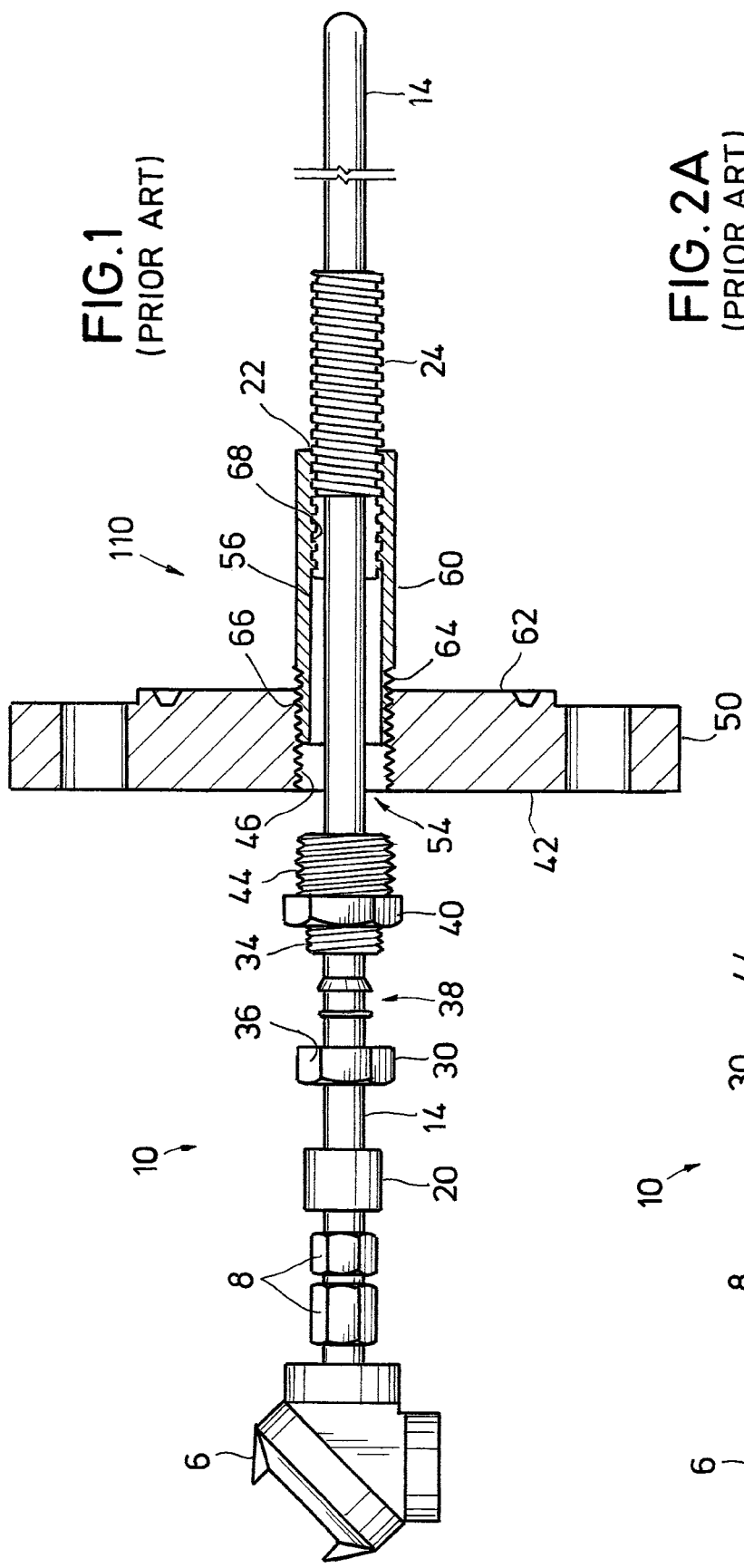
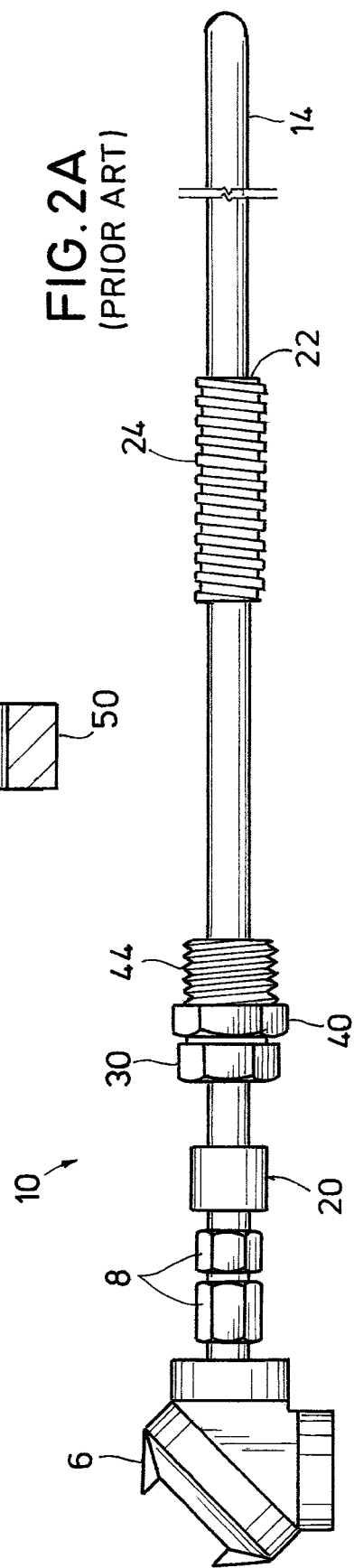

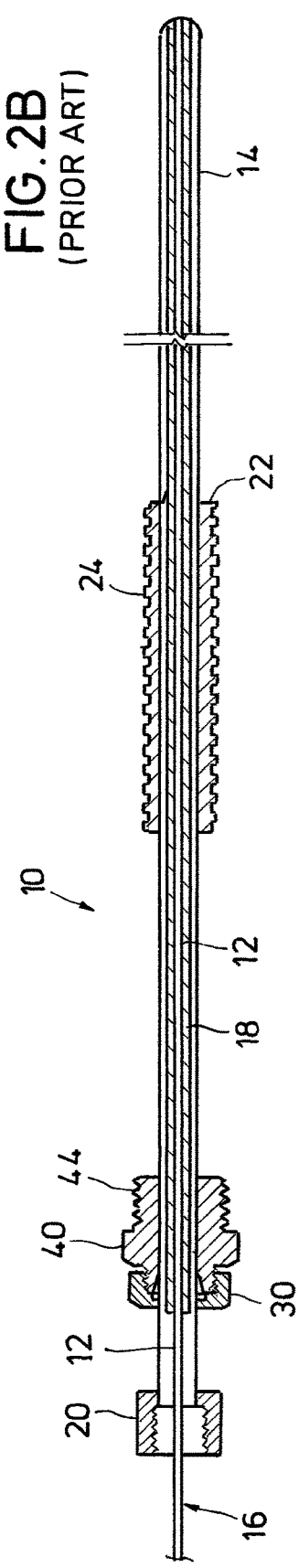
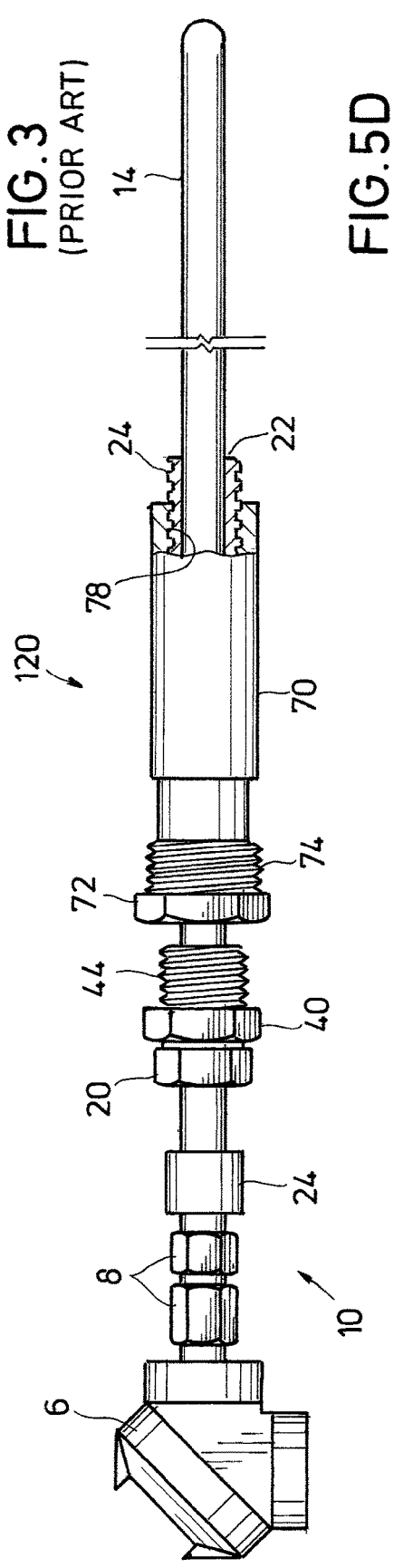
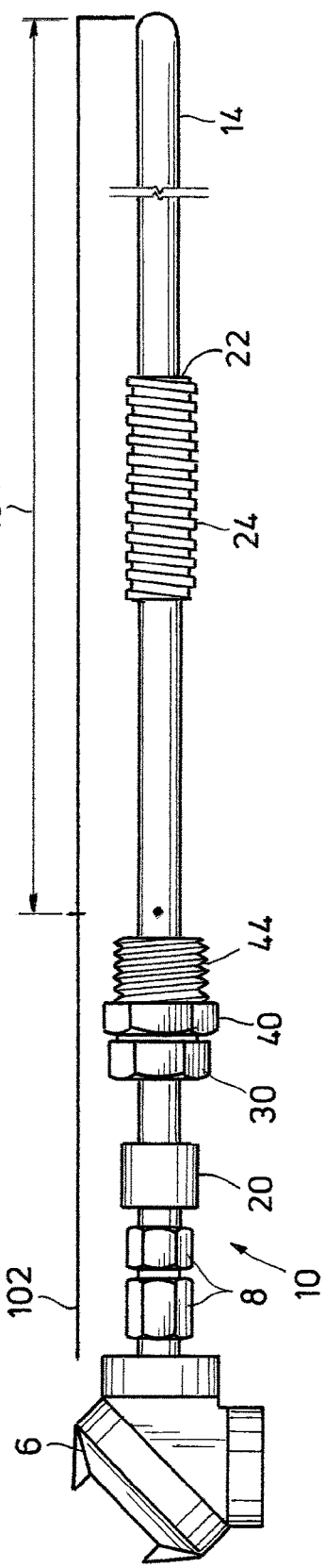

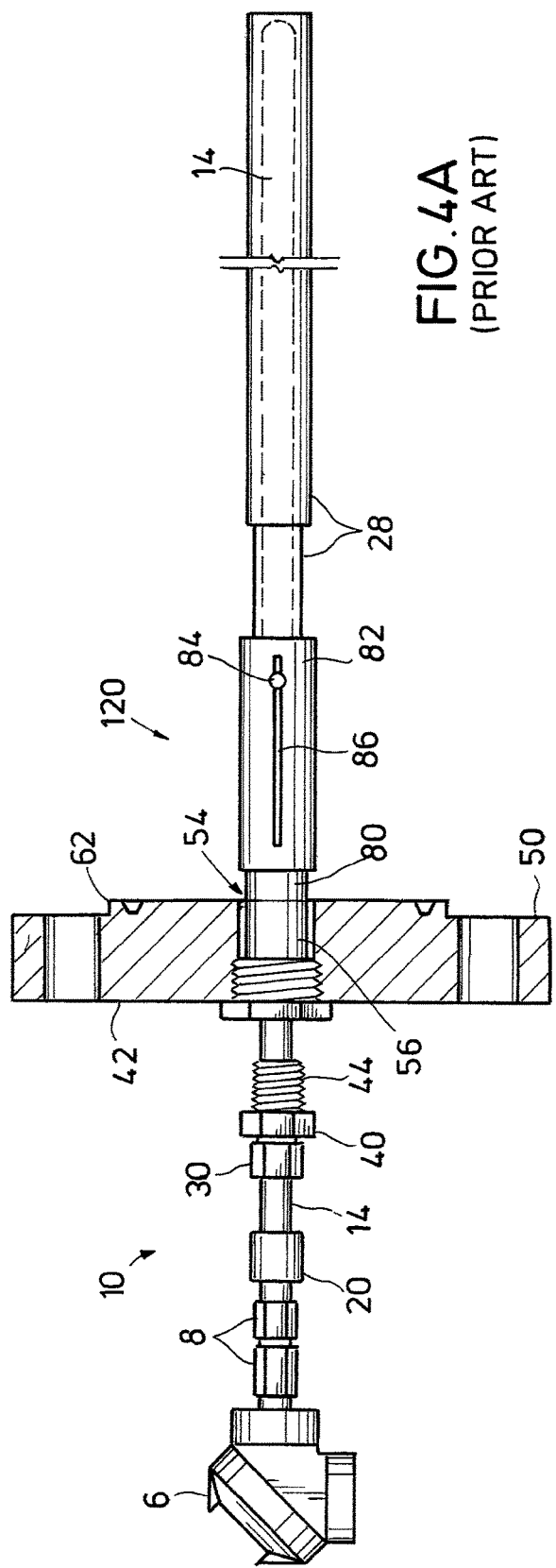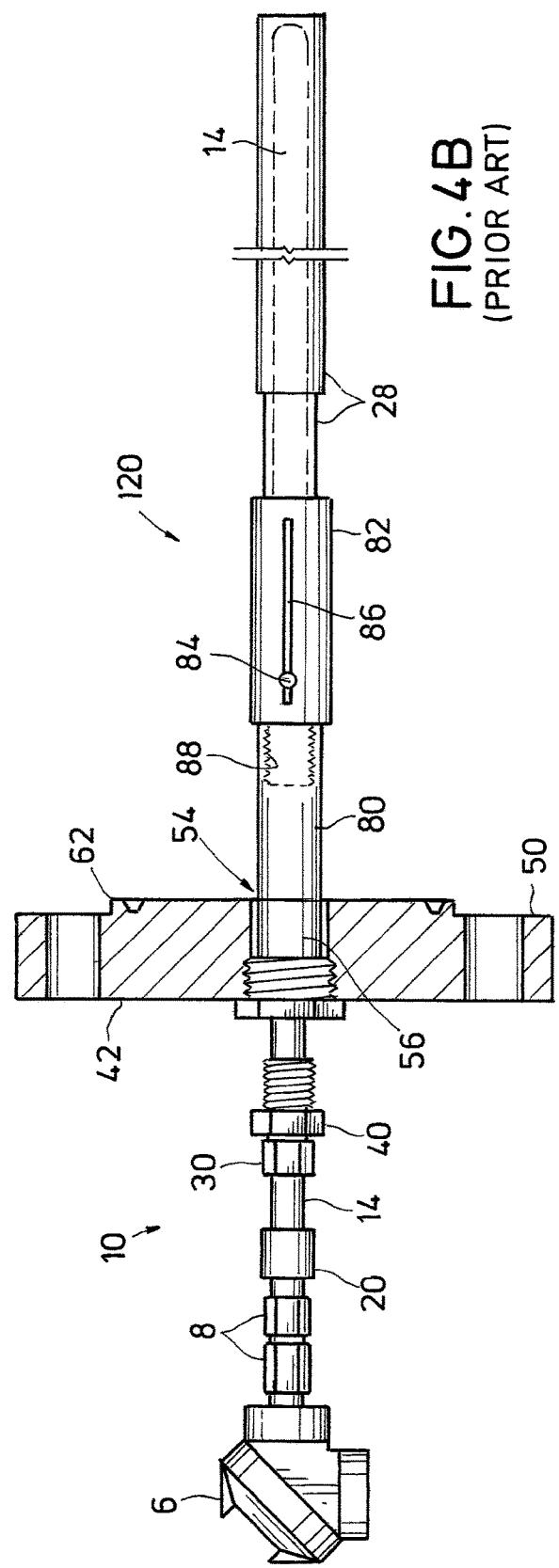

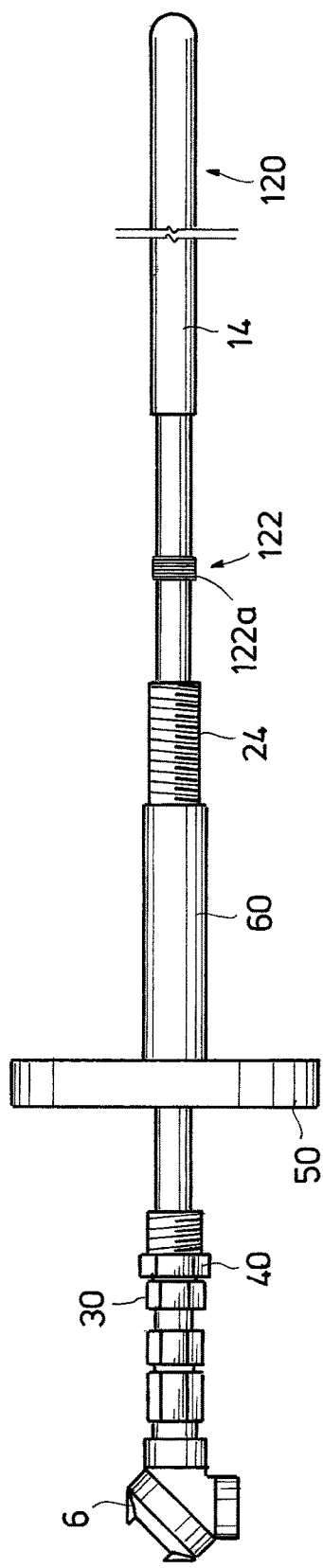
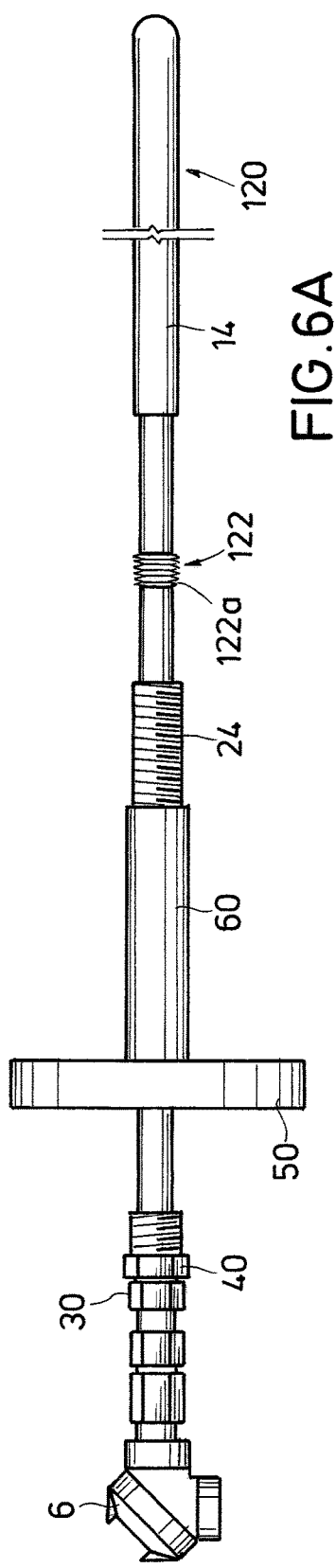
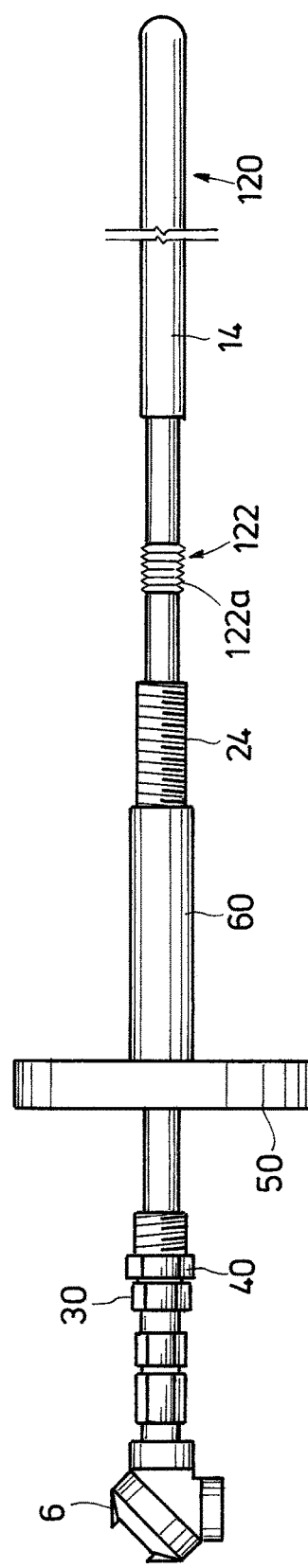

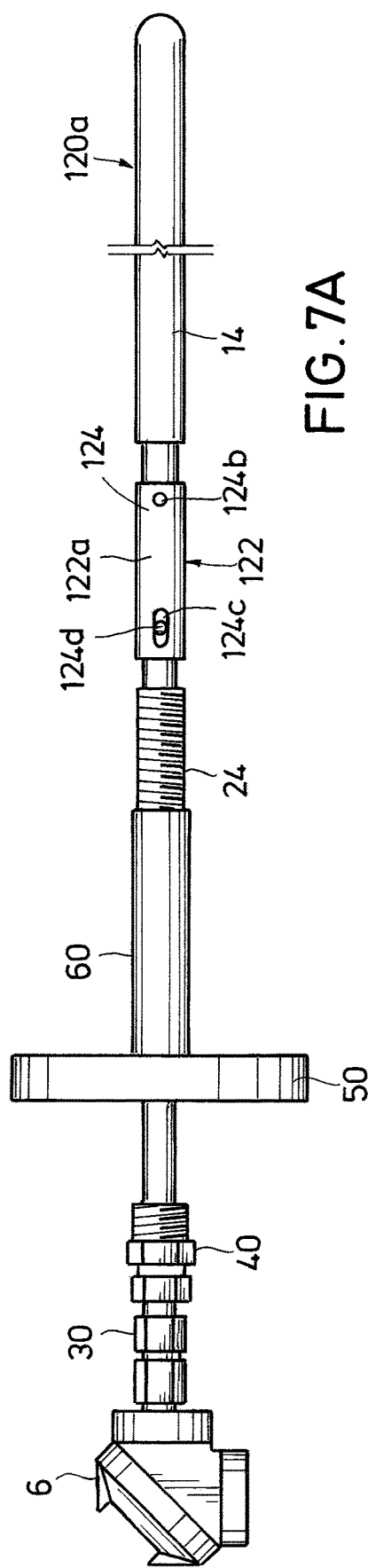
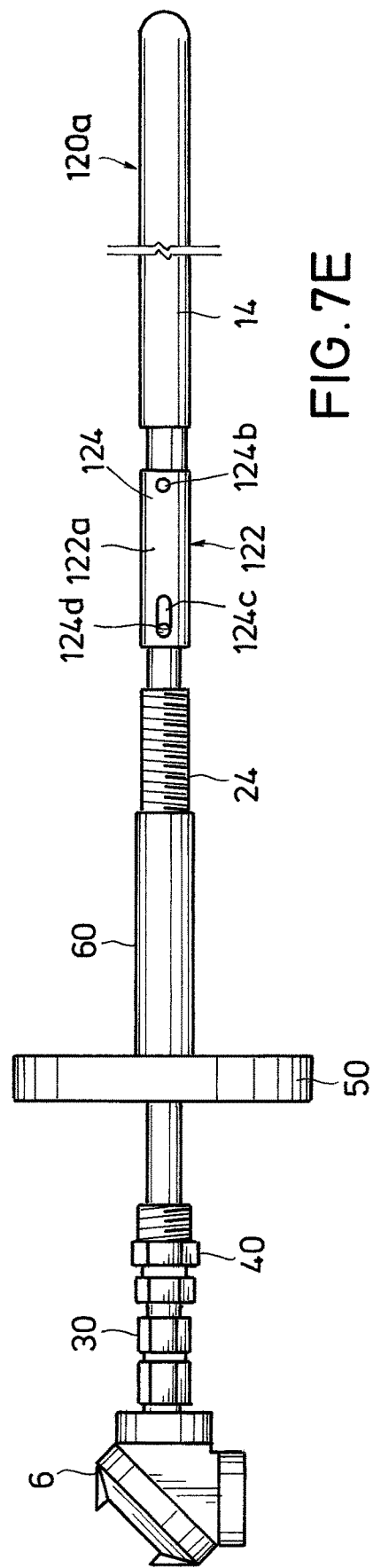

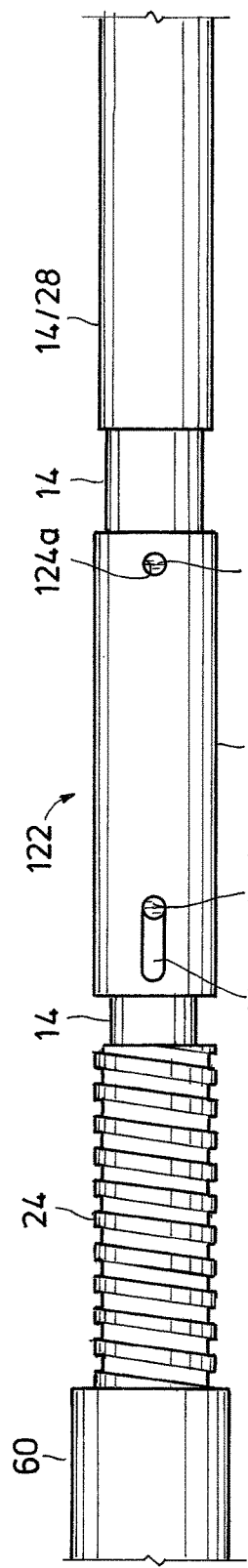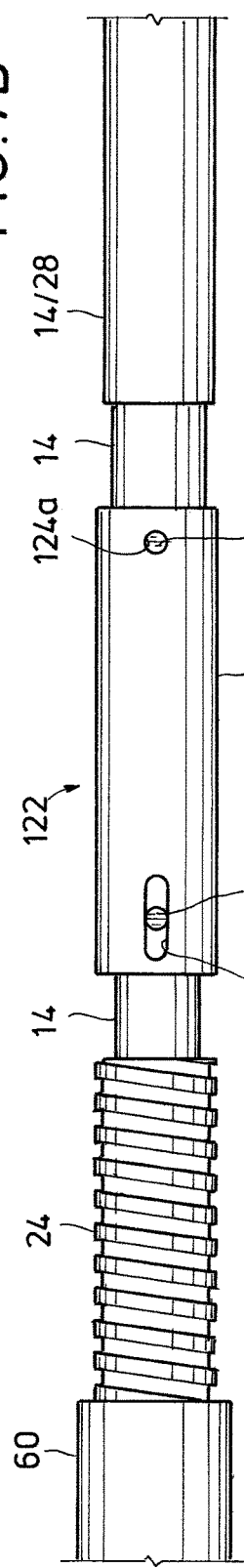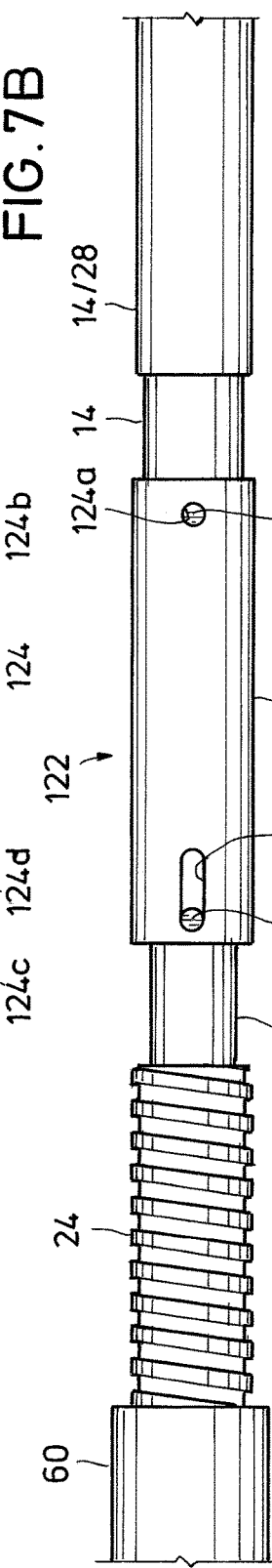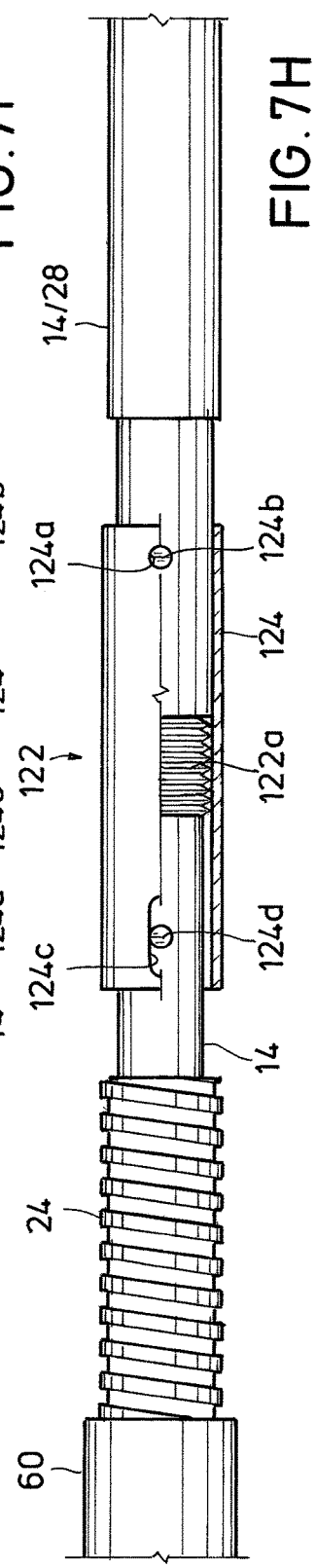

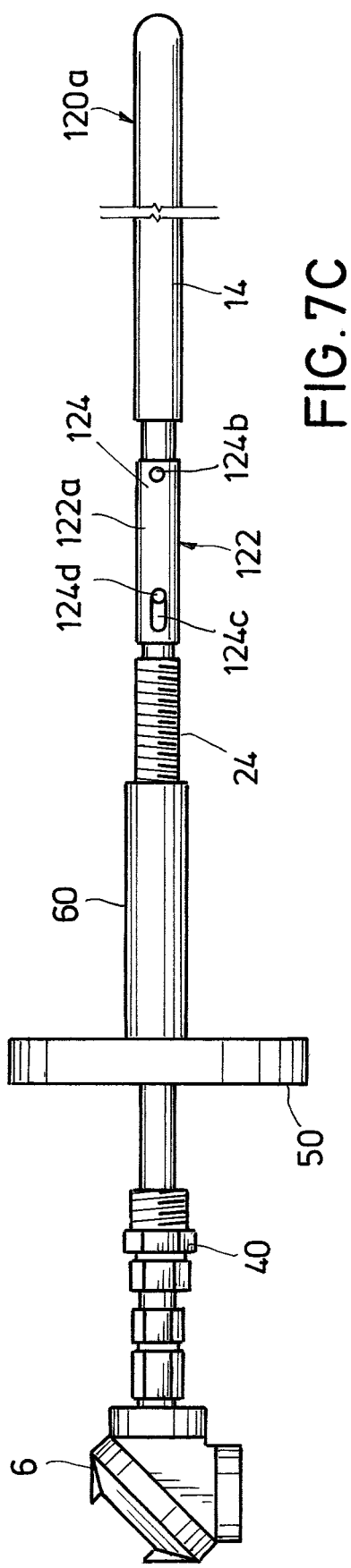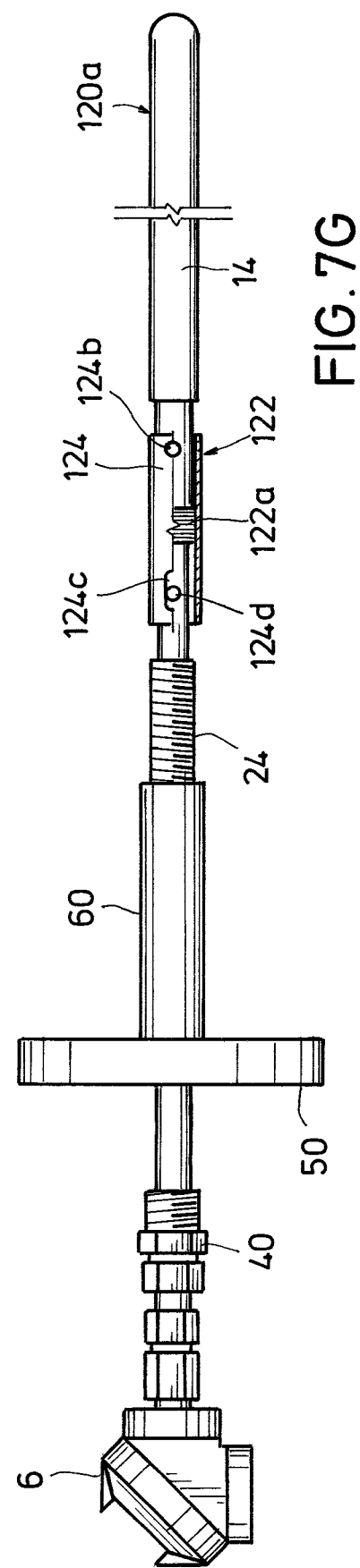

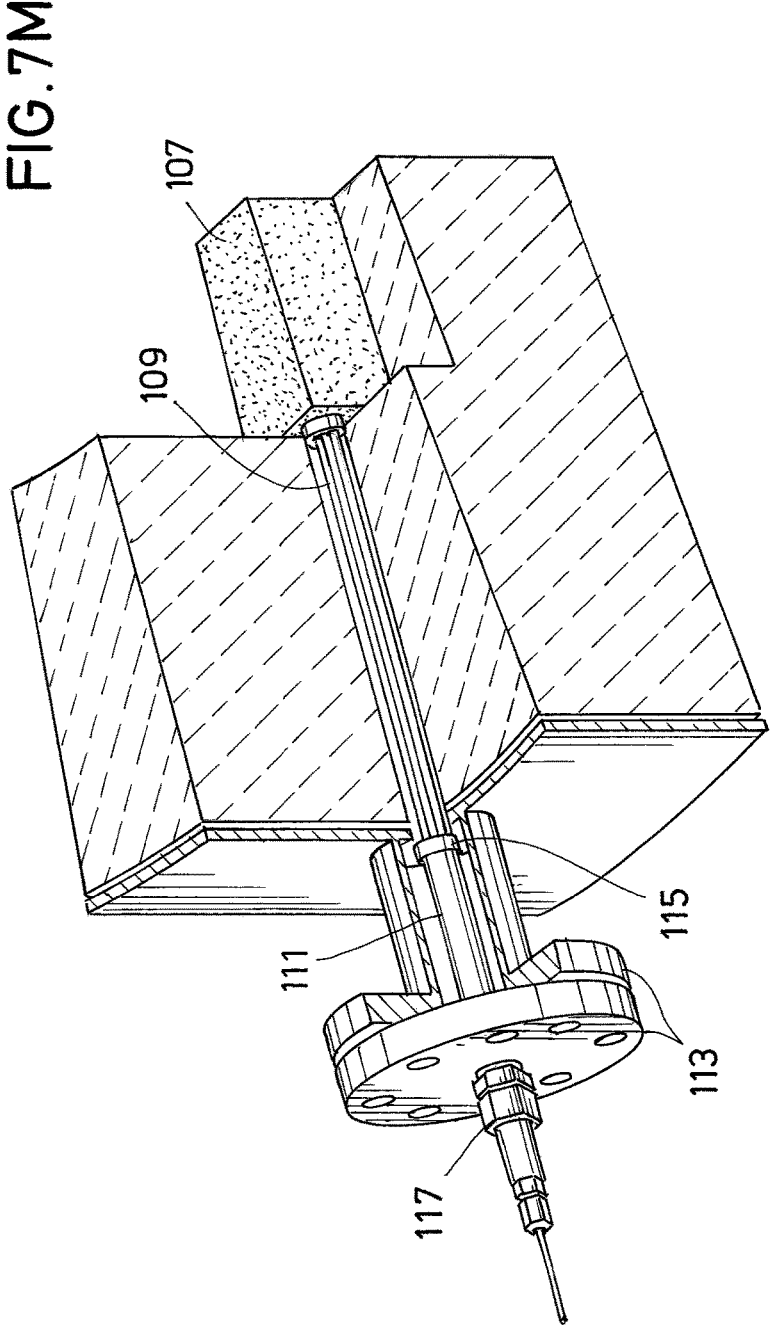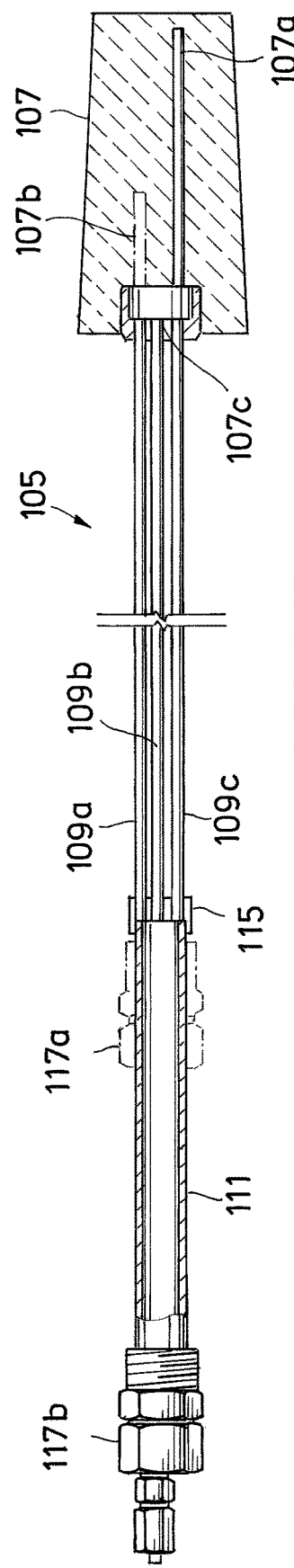

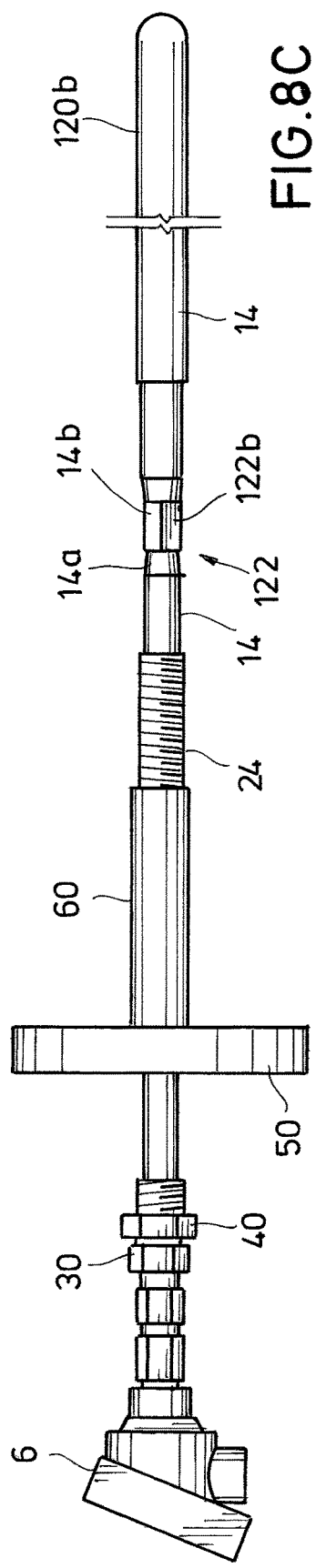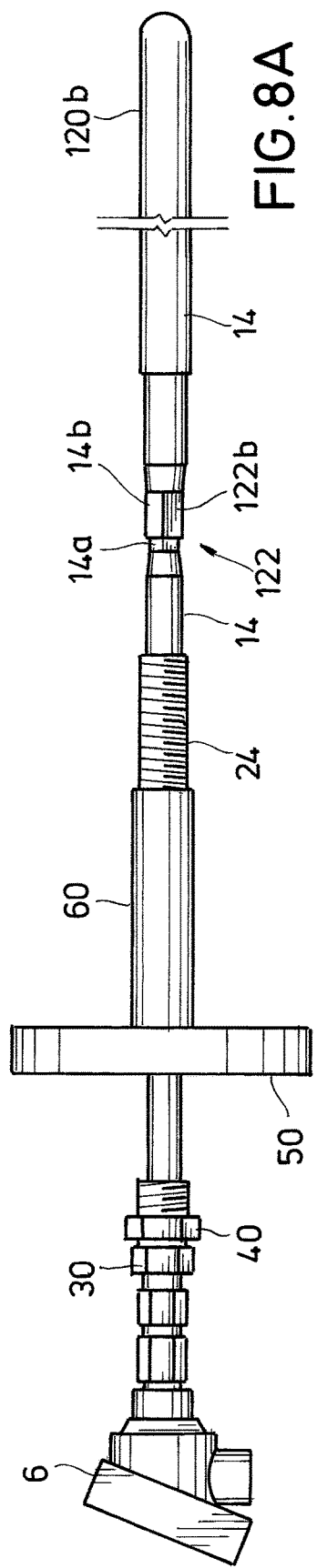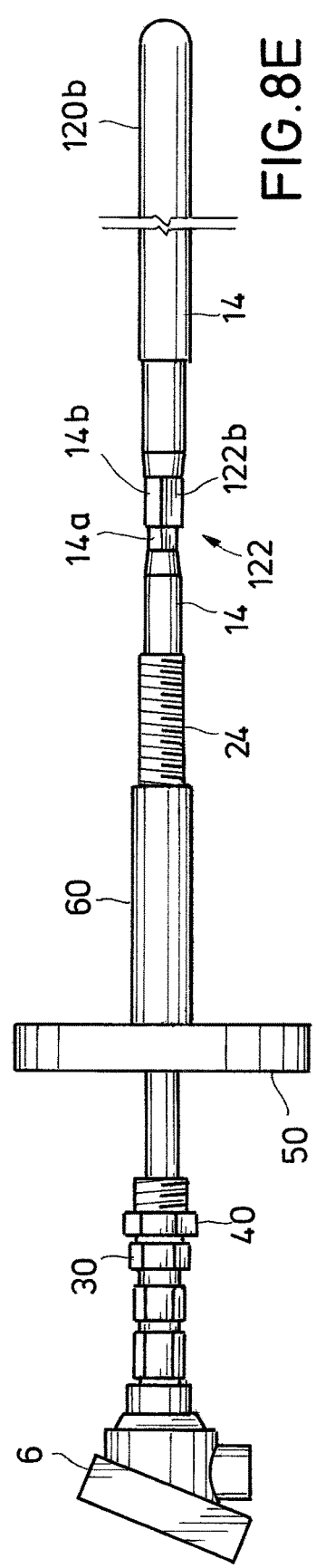

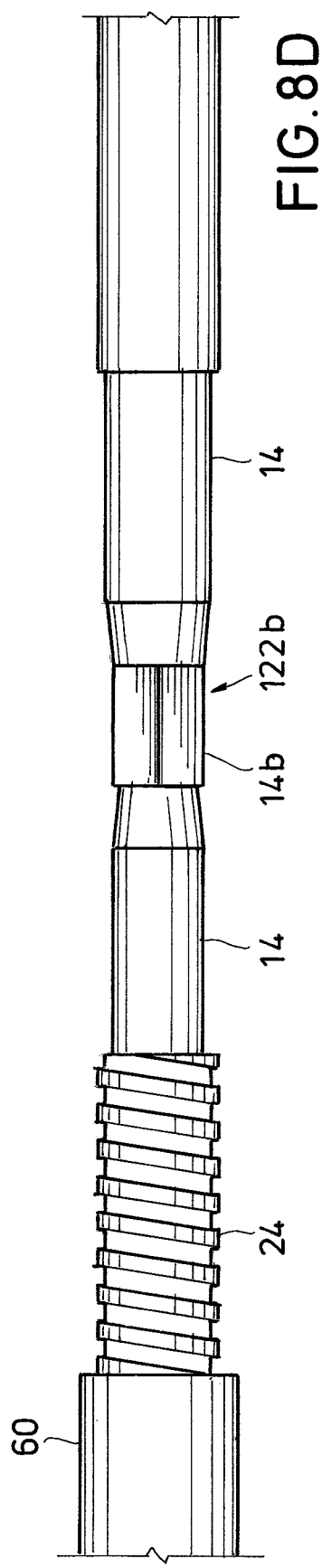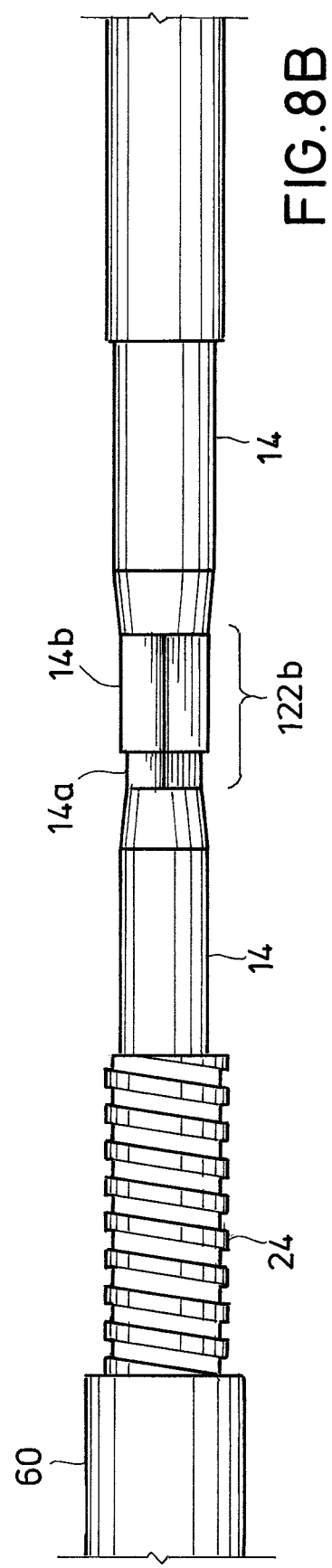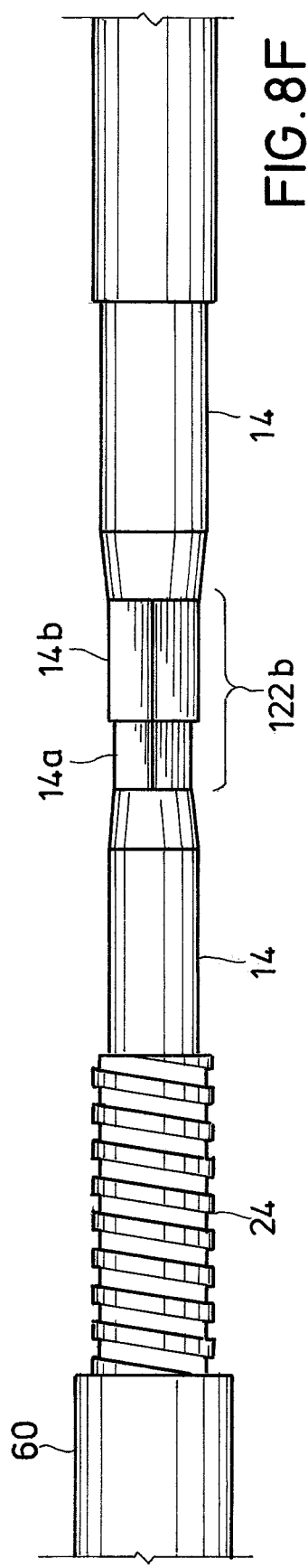

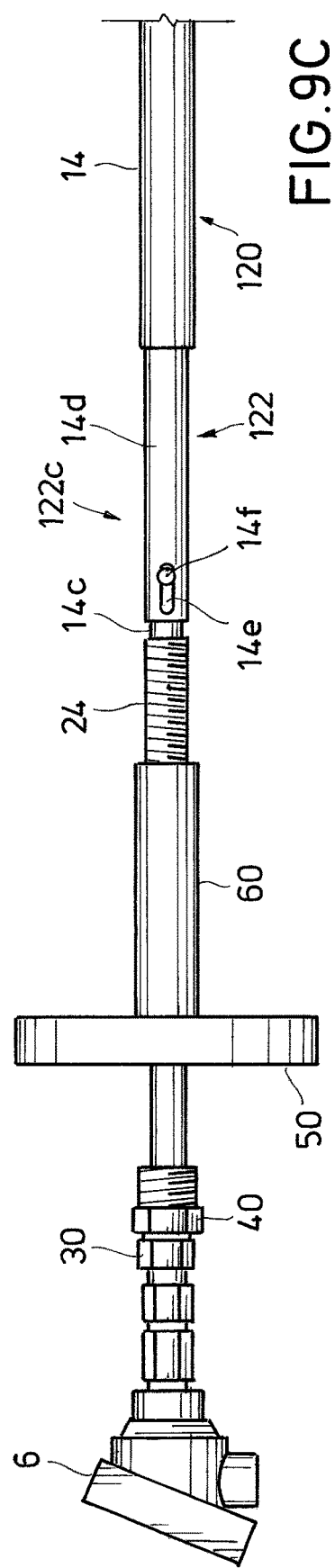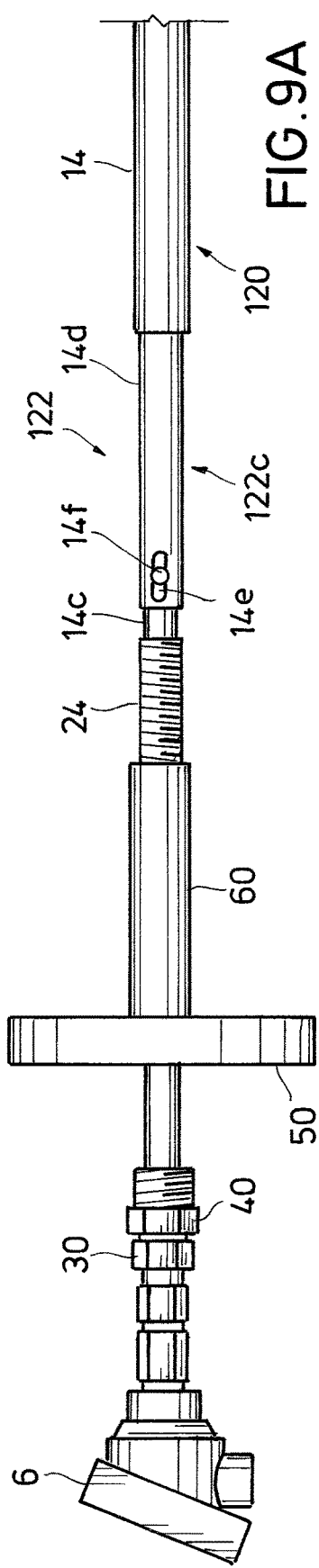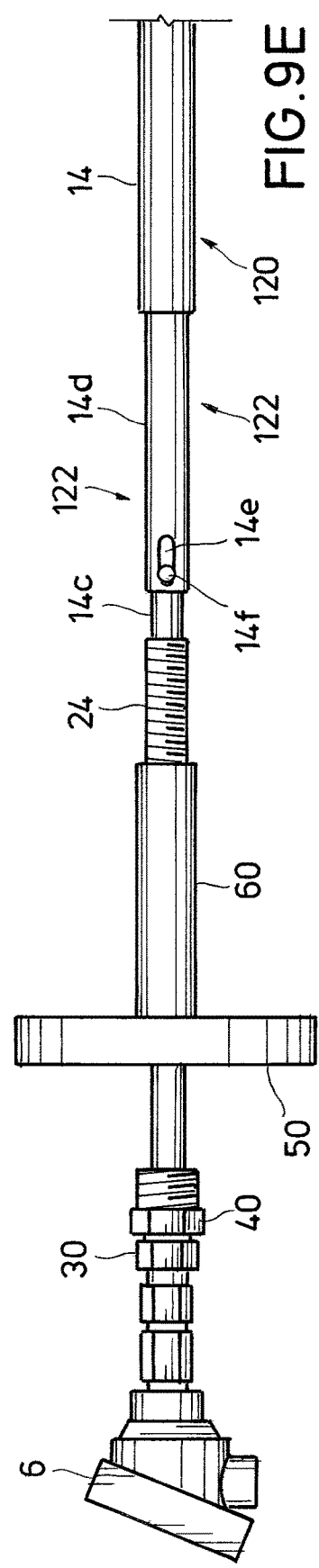

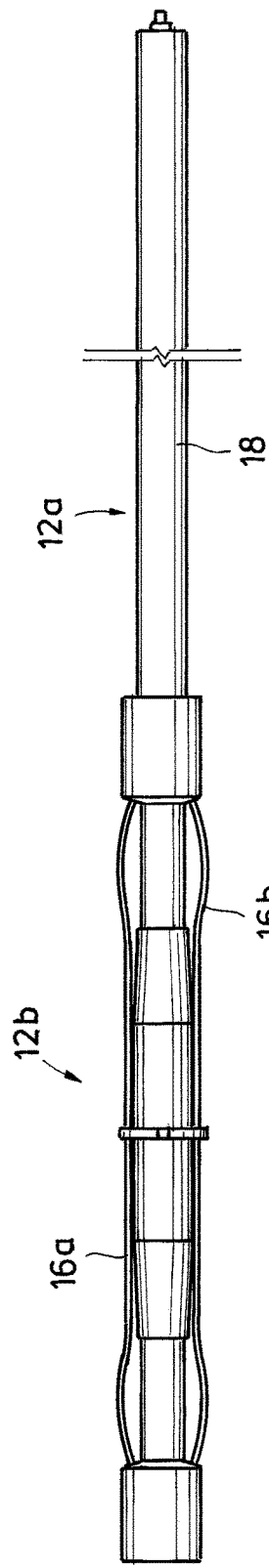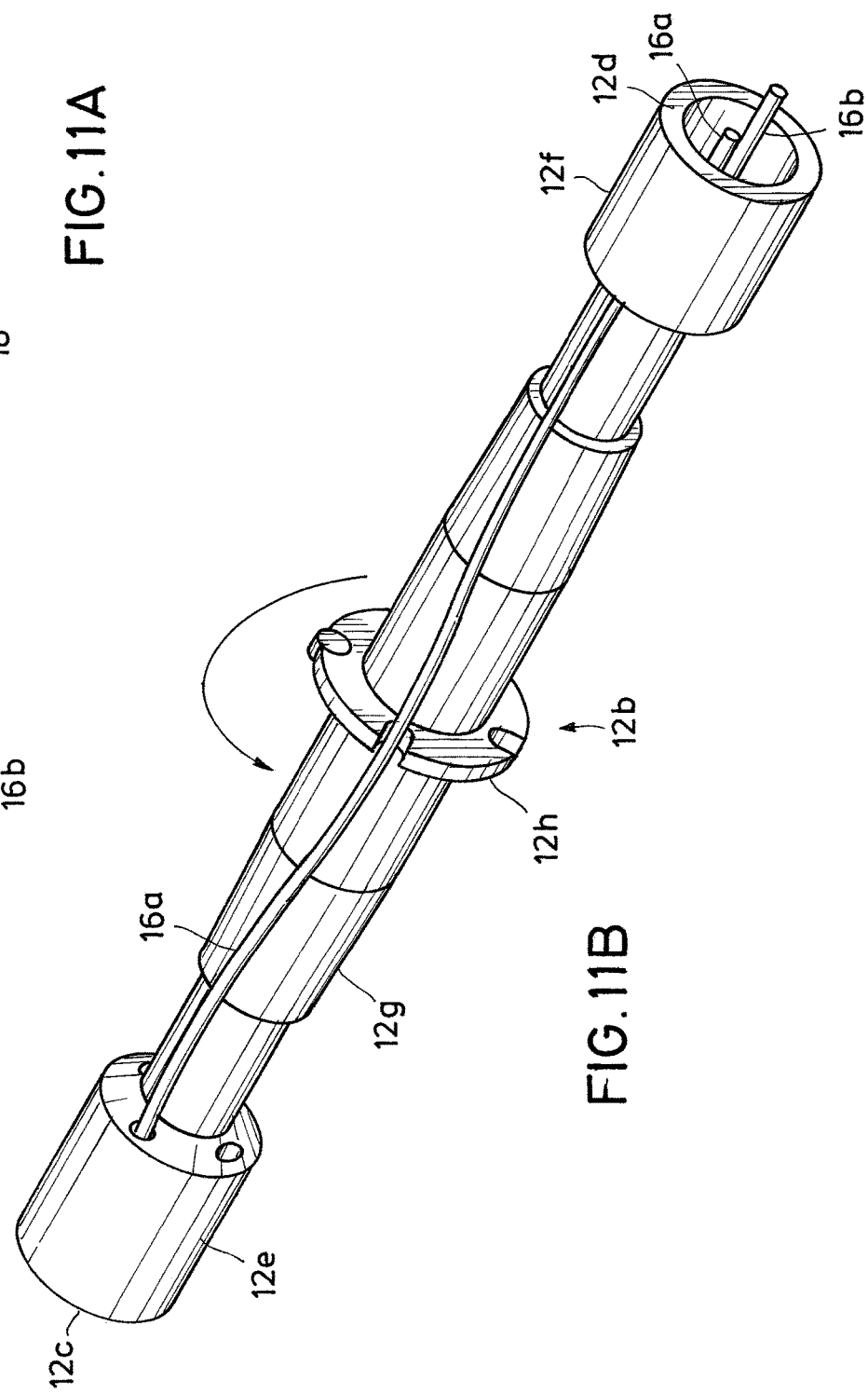
FIG.11A
FIG.11B

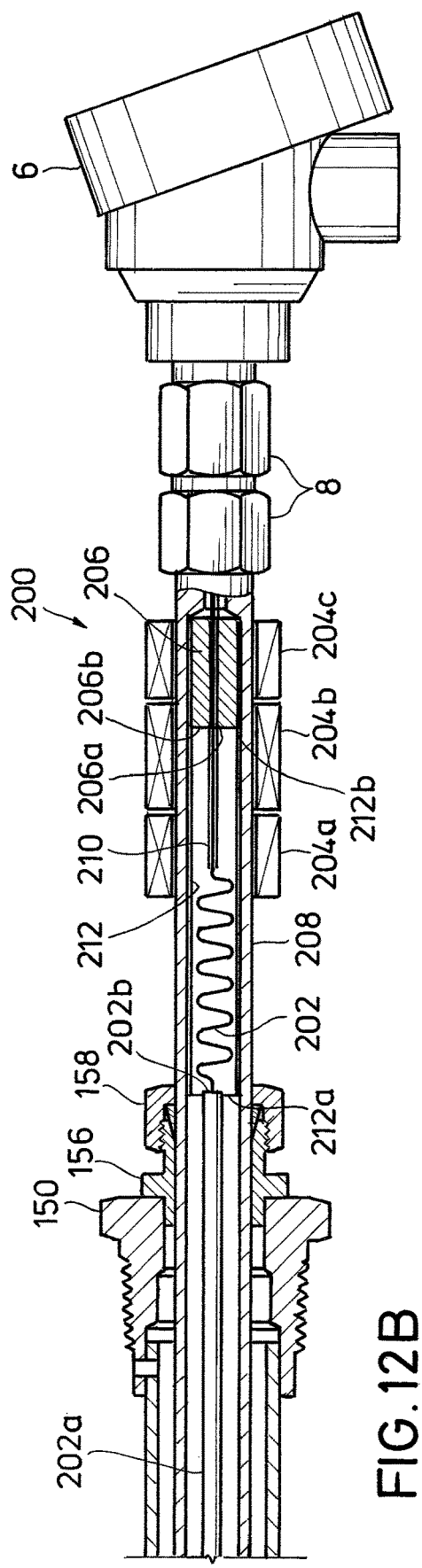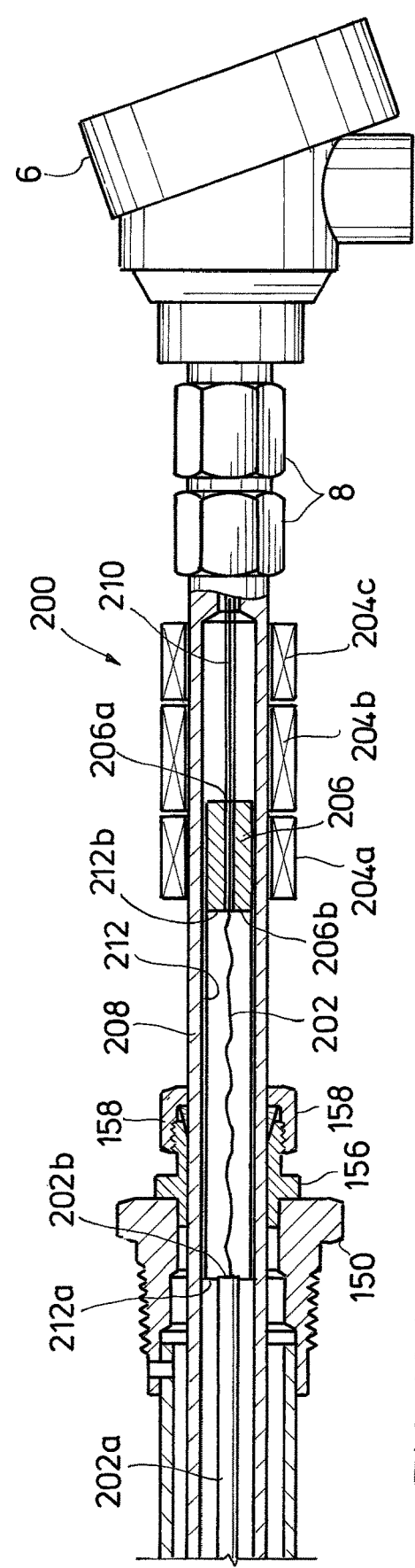
FIG.12B
FIG.12A

THERMOWELL WITH EXPANSION JOINT

CROSS REFERENCE TO RELATED APPLICATIONS

This application claims priority to and the benefit of U.S. Provisional Patent Application Ser. No. 62/565,300 filed on Sep. 29, 2017, which is incorporated by reference.

BACKGROUND OF THE INVENTION

1. Field of the Invention

This invention relates generally to temperature measurement devices and specifically to a thermowell with a flexible joint or an expansion joint for thermal expansion and contraction and for compensating for longitudinal and lateral movement.

2. Description of the Prior Art

Thermocouples are widely used for temperature measurement of machines and processes in the chemical, petroleum, electronics, food, manufacturing and various other industries. Temperature measurement of chemical processes, for example, requires the placement of thermocouples in process units, such as columns, strippers, scrubbers, and reactors. To ensure reliable, efficient operation and process control, process unit temperature is continuously monitored using several thermocouples embedded at various locations within the process unit. Each thermocouple is typically mounted into the wall of the process unit by threading or otherwise securing the thermocouple through a mounting flange or similar measurement port. The thermocouple secured through a mounting flange may be protected on the process unit interior by a thermowell, which is attached to the internal side of the measurement port and acts to shield the thermocouple from harsh process conditions. Alternatively, the thermocouple may be protected by an integrated thermocouple assembly or armor, where the thermocouple wires are encased within an inner protection tube, an inner filler material, and outer sheath or sheaths, all constructed of various chemical compositions.

A thermowell is a hollow tube in which a thermocouple is mounted and serves to protect the thermocouple from the environment in which it is placed to measure temperature. A thermowell is used as a protective sheath around a thermocouple in installations where harsh process conditions are encountered. Increasing the service life of thermocouples that operate in harsh environments has been the focus of much research and prior invention. An adjustable thermocouple mounting system for use in harsh operating conditions requires a thermowell that is also adjustable and is arranged to maintain a pressure seal with the machine or process unit after installation, which has adequate safeguards to prevent thermocouple back out or blowout under high pressures. Known and precise positioning of a thermocouple during installation is desirable. U.S. Pat. No. 7,465,086, issued to Foreman, Jr. and incorporated by reference, describes an adjustable-length thermowell and a mounting system that allows a thermocouple-thermowell assembly to be easily adjusted in length to achieve a proper position within a machine or process unit for accurate temperature measurement. The adjustable-length thermowell-thermocouple assembly can be installed at a desired depth in a process unit and then fixed in position at that depth. However, a process unit or a machine that is subject to a wide range of temperature will cause a thermocouple-thermowell assembly to expand and contract as the temperature changes. Also, vessels that operate at very high temperatures are lined on the inside with fire brick and/or refractory material, which can be many times thicker than the wall of the vessel. The thermocouple-thermowell assembly needs to pass through the wall of the vessel and through the thickness of the firebrick and/or refractory material. The firebrick and/or refractory material expands, contracts and moves during operation, particularly during changes in temperature, which can subject a thermocouple-thermowell assembly to various forces, which often causes a thermocouple to fail and no longer provide a reliable temperature measurement. In a process such as coal gasification, a molten slag flows within a vessel and penetrates into openings in the fire brick and/or refractory and hardens, thereby fixing or fastening a thermocouple-thermowell assembly to the fire brick and/or refractory, which subjects the assembly to any movement of the fire brick/refractory lining A need has existed for a thermowell-thermocouple assembly that can withstand harsh process conditions and forces upon it due to expansion, contraction and physical movement. This need has been addressed in the past with a strong, rigid thermowell-thermocouple assembly.

SUMMARY OF THE INVENTION

A thermowell-thermocouple assembly has an expansion joint for accommodating and tolerating various forces exerted on the assembly, such as the forces that cause expansion and contraction due to changes in temperature. A thermowell tube assembly includes an internal tubular fitting for attachment to a mounting structure; a thermowell tube engaged with the internal tubular fitting for receiving a thermocouple assembly within the internal tubular fitting and the thermowell tube; and an expansion joint in the internal tubular fitting and/or in the thermowell tube for allowing the thermowell tube to move with respect to the internal tubular fitting. Expansion joints that can be used include a bellows and a slip joint. One type of slip joint includes a first tube slidingly received over a second tube, wherein one of the tubes has a longitudinal slot and the other tube has a pin that is received in the slot. Each tube can have a slot and a pin. An enlarged hole can be used instead of a slot. A spring can be trapped in a slip joint. The thermowell assembly with expansion joint provides a protective sheath for a thermocouple assembly, and a different type of sensor other than for temperature measurement can be housed in the thermowell assembly.

BRIEF DESCRIPTION OF THE DRAWINGS

By way of illustration and not limitation, the invention is described in detail hereinafter on the basis of the embodiments represented in the accompanying figures. FIGS. 1-5E were first described in U.S. Pat. No. 7,465,086, which provides context for the present invention.

FIG. 1 is a side elevation view partially in cross-section of an adjustable thermowell mounting system and method, showing a thermocouple-thermowell assembly which has been inserted into and threaded into a hollow internal tube attached to the internal side of a mounting flange and with a hollow external tube and locking and compression devices which can be used to lock and seal the thermowell tube to the mounting flange.

FIG. 2A is a side elevation view of a preassembled thermocouple-thermowell assembly prior to its installation into an adjustable thermowell mounting system.

FIG. 2B is a simplified cross-sectional view of a preassembled thermocouple-thermowell assembly with a thermocouple inside the thermowell tube.

FIG. 3 is a side elevation of an alternative embodiment with a one-piece hollow fitting that is inserted through the mounting flange aperture and secured to the exterior of the mounting flange.

FIG. 4A is a side elevation of an alternative embodiment with a one-piece hollow inner fitting that has an additional feature of a sliding outer protective sheath, which slides toward the interior of the process unit or machine as the thermocouple-thermowell assembly is rotated through the female threads of the hollow fitting.

FIG. 4B is a side elevation of the alternative embodiment of FIG. 4A when the sliding outer protective sheath is fully extended toward the interior of the process unit or machine.

FIGS. 5A through 5E illustrate a method for assembling the thermocouple-thermowell assembly in a process unit.

FIG. 5A illustrates an initial step where a hollow inner fitting or tube is attached to the internal side of a mounting flange prior to the installation of the mounting flange to a process unit or machine, such as a gasifier nozzle.

FIG. 5B illustrates a second step in the method of the invention where the mounting flange with the attached hollow fitting is installed onto a process unit or machine.

FIG. 5C illustrates a third step in the method of installing the thermocouple-thermowell assembly where the precise depth to which the thermocouple-thermowell assembly is to be installed is measured using a measuring tape or a rod inserted through the mounting flange aperture.

FIG. 5D illustrates a fourth step in the method where the depth measurement of FIG. 5C is marked on the thermowell tube of the thermocouple-thermowell assembly.

FIG. 5E illustrates a final step in the installation method where the thermocouple-thermowell assembly is inserted through the mounting flange aperture, threaded into the hollow fitting attached to the internal side of the mounting flange, and secured in place using a compression fitting threaded onto a hollow external fitting attached to the mounting flange.

FIG. 6A is a side elevation view of a preassembled thermocouple-thermowell assembly that has an expansion joint, which is a bellows, according to the present invention.

FIG. 6C is a side elevation of the thermocouple-thermowell assembly of FIG. 6A with the bellows in a compressed state.

FIG. 6E is a side elevation of the thermocouple-thermowell assembly of FIG. 6A with the bellows in an expanded state.

FIG. 7A is a side elevation view of a preassembled thermocouple-thermowell assembly that has an expansion joint, which is a bellows, and a sleeve that surrounds, protects and supports the bellows, according to the present invention.

FIG. 7B is a side elevation of the support sleeve in FIG. 7A, where the bellows are in a normal state.

FIG. 7C is a side elevation of the thermocouple-thermowell assembly of FIG. 7A with the bellows in a compressed state.

FIG. 7D is a side elevation of the support sleeve in FIG. 7C with the bellows in its compressed state.

FIG. 7E is a side elevation of the thermocouple-thermowell assembly of FIG. 7A with the bellows in an expanded state.

FIG. 7F is a side elevation of the support sleeve in FIG. 7E with the bellows in its expanded state.

FIG. 7G is a side elevation view of the preassembled thermocouple-thermowell assembly of FIG. 7A with a portion of the support sleeve cut away to reveal the bellows, which is in its normal state.

FIG. 7H is a close-up view of the expansion joint of FIG. 7G with a portion of the support sleeve cut away to reveal the bellows, which is in its normal state.

FIG. 7M is a side elevation view in partial cross-section of the thermocouple-thermowell assembly of FIG. 7K fully installed in the process unit.

FIG. 7N is a side elevation view in partial cross-section of a thermocouple-thermowell assembly terminating at a distal end in a refractory brick, according to the present invention.

FIG. 8A is a side elevation view of a preassembled thermocouple-thermowell assembly that has an expansion joint, which is a sliding, hexagonal coupling, according to the present invention.

FIG. 8B is a side elevation of the coupling in FIG. 8A in its normal state.

FIG. 8C is a side elevation of the thermocouple-thermowell assembly of FIG. 8A with the coupling in a compressed state.

FIG. 8D is a side elevation of the coupling in FIG. 8C in its compressed state.

FIG. 8E is a side elevation of the thermocouple-thermowell assembly of FIG. 8A with the coupling in an expanded state.

FIG. 8F is a side elevation of the coupling in FIG. 8E in its expanded state.

FIG. 9A is a side elevation view of a preassembled thermocouple-thermowell assembly that has an expansion joint, which is a pin-and-slot coupling, according to the present invention.

FIG. 9C is a side elevation of the thermocouple-thermowell assembly of FIG. 9A with the coupling in a compressed state.

FIG. 9E is a side elevation of the thermocouple-thermowell assembly of FIG. 9A with the coupling in an expanded state.

FIG. 11A is a side elevation of a thermocouple assembly that has a thermocouple wire receiver on a proximal end, according to the present invention.

FIG. 11B is a perspective view of the wire receiver of FIG. 10A.

FIG. 12A is a side elevation in partial cross-section of a thermowell-thermocouple assembly with a sensor assembly for measuring the position of the thermocouple assembly.

FIG. 12B is a side elevation in partial cross-section of the thermowell-thermocouple assembly of FIG. 12A with the thermocouple assembly in a different position.

DETAILED DESCRIPTION OF THE INVENTION

Figure 5A:
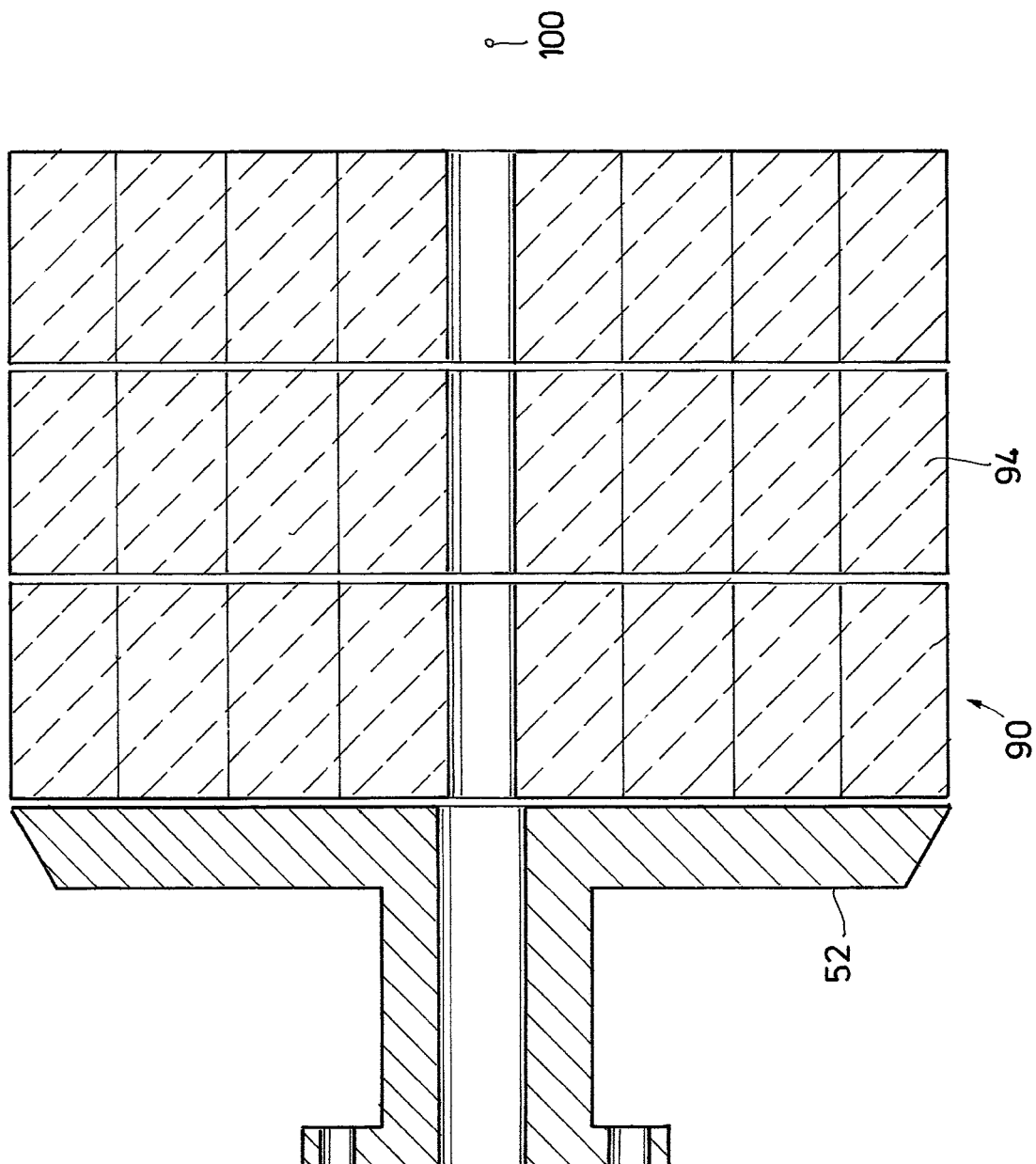

A thermowell mounting system is provided that achieves advantages of precise field adjustability of thermocouple-thermowell depth, pressure seal creation with a machine or process unit after thermocouple-thermowell installation, safety features which inhibit thermocouple-thermowell back out or blowout at high operating pressures, and an expansion joint for accommodating and tolerating expansion and contraction of the thermocouple-thermowell assembly due to temperature changes and for accommodating and tolerating forces on the thermocouple-thermowell assembly that are transverse to the longitudinal axis of the assembly. A thermocouple-thermowell assembly often encounters a variety of forces while in operation, particularly when the process unit is a gasifier. The thermocouple-thermowell assembly passes through refractory, which expands, contracts and moves in other ways, thus applying various forces in various directions on the assembly.

First, a description of the thermocouple-thermowell assembly is provided with respect to its adjustable length and with reference to U.S. Pat. No. 7,465,086, which issued to Foreman, Jr. on Dec. 16, 2008, and which is incorporated by reference. A thermocouple-thermowell assembly of finite length can be precisely adjusted, within its range of adjustability, to any desired depth within the machine or process unit, without the need of a thermowell or orifice bottom for depth guidance. Providing a thermocouple-thermowell assembly of finite length but with the capability to adjust the depth of the thermocouple-thermowell assembly during field installation saves both the time and expense of ascertaining and stockpiling thermocouples and/or thermowells of varying lengths in order to fit particular application depths. The preferred embodiment of the invention is designed to provide an adjustable depth thermocouple-thermowell assembly for temperature measurement of machines and process units that operate at extreme temperatures and/or pressures, where the thermowell-thermocouple assembly can be fixed at a desired length or depth, but can also tolerate to some extent expansion, contraction and lateral or bending forces.

A thermowell mounting system 110 is shown in FIGS. 1, 2A, and 2B and includes a thermocouple 12 preassembled into a thermowell tube 14 to form a thermocouple-thermowell assembly 10 which extends through a mounting flange 50. The preassembled thermocouple-thermowell assembly 10, with thermocouple head 6 and thermocouple seal 8, is shown in FIG. 2A. The embodiment of FIG. 1 features two separate fittings, 40 and 60. Compression or exterior fitting 40 extends outwardly from the external side 42 of the mounting flange 50. As shown in FIG. 1, exterior fitting 40 is a bored-through, 0.75 inch diameter tube by 1 inch diameter pipe connector (for example) with male threads 44, which are arranged to be threaded into the internal female threads 46 of the mounting flange 50. At the opposite end, exterior fitting 40 has male compression seal threads 34 which thread with the internal female compression seal threads 36 of a fitting cap 30. Additionally, a dual (two-piece) ferrule swage-type compression seal 38 is positioned between the male compression seal threads 34 and the cap 30 to create a compression seal between the exterior or compression fitting 40 and the thermowell tube 14 of the thermocouple-thermowell assembly 10. Before cap 30 is threaded onto exterior fitting 40, cap 30, the dual ferrule swage-type compression seal 38, and fitting 40 can each slide longitudinally along the exterior surface of thermowell tube 14.

Hollow internal fitting 60 extends inwardly from the internal side 62 of the mounting flange 50. It is a bored-through, 1 inch diameter machined piece that is 5.25 inches in length (for example). The internal fitting 60 has male threads 64 with a right-hand thread pattern on one end, a proximal end, that are threaded into female threads 66 of the mounting flange 50 as shown in FIG. 1 (see also FIG. 5A). Internal fitting 60 also has internal female threads 68 with a left-hand thread pattern (for example), which engage male threads 24 provided along a length on the external surface of thermowell tube 14. The left-hand female thread pattern 68 of the hollow fitting 60 is cooperatively arranged with the male threads 24 of thermocouple-thermowell assembly 10 so that one counterclockwise or clockwise rotation of the assembly 10 respectively moves the assembly 10 a distance of 0.25 inch, for example, into or out of the mounting flange 50.

Figure 5B:
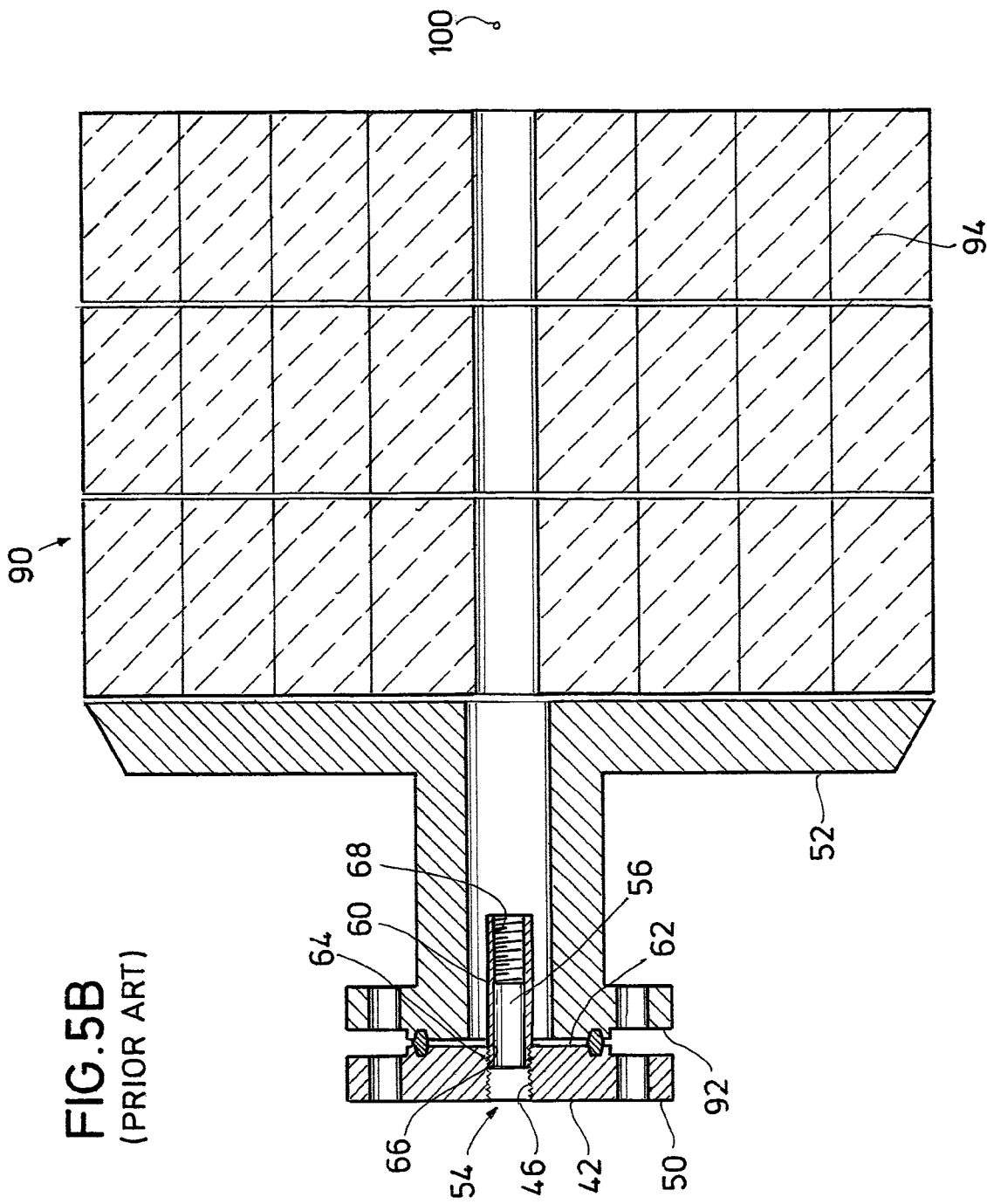

When coupled to the mounting flange 50, the hollow fitting 60 creates an inner passage 56 through the aperture 54 of mounting flange 50 for the placement of thermocouple-thermowell assembly 10 therein (see also FIGS. 5A and 5B). Compression fitting 40, seal 38 and fitting cap 30 are also placed to slide along thermowell tube 14 on the external side of flange 50. In addition to using screw threads to couple the fittings 40, 60 to the mounting flange 50 (or process wall 52 in FIG. 5A), either one or both of the two fittings 40, 60 alternatively can be attached to the flange 50 or process wall 52 by welding, press-fitting, etc. While the fittings 40, 60 extending from the external 42 and internal 62 sides of the mounting flange 50 are shown as two separate pieces, one commercially available fitting 40 and one custom machined fitting 60, the two fittings 40, 60 can be custom machined as one-piece and secured through a flange or wall by threads, welding, press fitting, etc.

FIG. 3 shows an alternative embodiment 70 of a one-piece hollow fitting that is inserted through the mounting flange aperture 54 and coupled to the mounting flange 50. Fitting 70 is a bored-through, 1 inch diameter tube by 1.5 inch diameter pipe connector with male threads 74, which are threaded into the internal female threads 46 of the mounting flange 50. In addition to threads, the one-piece hollow fitting 70 may also be coupled to the mounting flange 50 using welding, press fitting, or other means. At its external or proximal end 72, fitting 70 has internal female threads 76, which are arranged to receive the male threads 44 of compression fitting 40. The fitting 70 also has internal female threads 78 with a left-hand thread pattern (for example), which is arranged and designed so that one counterclockwise or clockwise rotation of the thermowell tube 14 of the thermocouple-thermowell assembly 10 moves the assembly 10 a distance of 0.25 inch (for example) into or out of the mounting flange 50.

Another alternative embodiment 80 of the one-piece hollow fitting 70 is shown in FIGS. 4A and 4B. Fitting 80 includes a sliding outer protective sheath 82, which, without rotating, slides toward the interior 100 (see FIG. 5A) of the process unit or machine 90 as the thermocouple-thermowell assembly 10 is rotated through internal female threads 88 of fitting 80. A protective ceramic tube 28 secured to the interior or distal end of sheath 82 protects thermowell 14 from a harsh environment of the process unit 90. For example, as the thermowell tube 14 moves longitudinally through fitting 80 by screwing its male threads 24 into female threads 88, a surface on the thermowell tube 14 engages a cooperative surface in the interior of sleeve 82 thereby driving sleeve 82 inwardly with the inward motion of the tube 14.

Fitting 80 has a guide pin 84 attached to its exterior surface near its internal end. The sliding outer protective sheath 82 has a slot 86 formed in its external surface through which the guide pin 84 couples the sheath 82 to the fitting 80. The slot 86 is arranged and designed to allow the sheath 82 to slide longitudinally, relative to the guide pin 84, over the exterior surface of the fitting 80 and beyond its internal, distal end, as shown in FIG. 4B. Ceramic or metal tubular sections 28 are attached to the internal, distal end of sleeve 82 to surround thermowell 14 to provide additional protection to the thermocouple-thermowell assembly 10 from harsh process conditions.

An advantage of the alternative embodiment 80 is the protection of outer surface ceramics 28 during the installation of the thermocouple-thermowell assembly 10. In process units with a refractory lining, the refractory 94 (see FIG. 5E) is typically rough and nonuniform, thereby causing the thermocouple-thermowell assembly 10 to contact the sides of the refractory 94 during installation. However, when using fitting 80, the outer protective sheath 82 and the attached ceramics/metal sleeves 28 only move longitudinally into and out of the interior 100 of the process unit or machine 90 even though the thermocouple-thermowell assembly 10 is being rotated through fitting 80 to adjust its depth. As a result, the alternative embodiment 80 greatly reduces the risk that a critical ceramic sleeve or tube 28 on the outer surface of the thermowell tube 14 that is attached to the sliding outer protective sheath 82 will be damaged by the refractory 94 during assembly 10 installation.

FIG. 2B illustrates the internal construction of the thermocouple-thermowell assembly 10. A thermocouple assembly 12 is encased or otherwise protected by a thermowell 14 constructed with a 0.75 inch diameter. A 0.5 inch diameter male NPT (U.S. National Pipe Thread) compression fitting 20, which is used to secure the thermocouple assembly 12 inside the thermowell 14, is attached to the external, proximal end (i.e. the non-process side) of the hollow thermowell 14 by welding the fitting 20 into place. Fitting cap 30 and the dual ferrule swage-type compression seal 38 (see FIG. 1) are placed onto the thermowell 14 and positioned near the external, proximal end of thermowell 14. The compression fitting 40, which threads into the external side 42 of the mounting flange 50, is placed onto the thermowell 14 and positioned near the external, proximal end of the thermowell 14.

A metal sleeve 22 having male threads 24 with a left-hand thread pattern is welded onto the thermowell tube 14 at a location that will engage the left-hand female thread pattern 68 of the hollow internal fitting 60 attached to the internal side 62 of the mounting flange 50. Optionally, a metal or ceramic protection tube may be placed over the end of thermowell tube 14 to further protect the internal thermocouple assembly 12 from contamination and process conditions. The thermocouple 12, comprising thermocouple wires 16 and a protective sheath 18, which may comprise metal, ceramics or a mineral-insulated cable, is inserted into the hollow thermowell 14 at its external, proximal end. The thermocouple 12 is secured to the thermowell 14 using the ½ inch diameter female NPT compression fitting 20 previously attached to the external end of the thermowell tube 14.

Figure 5C:
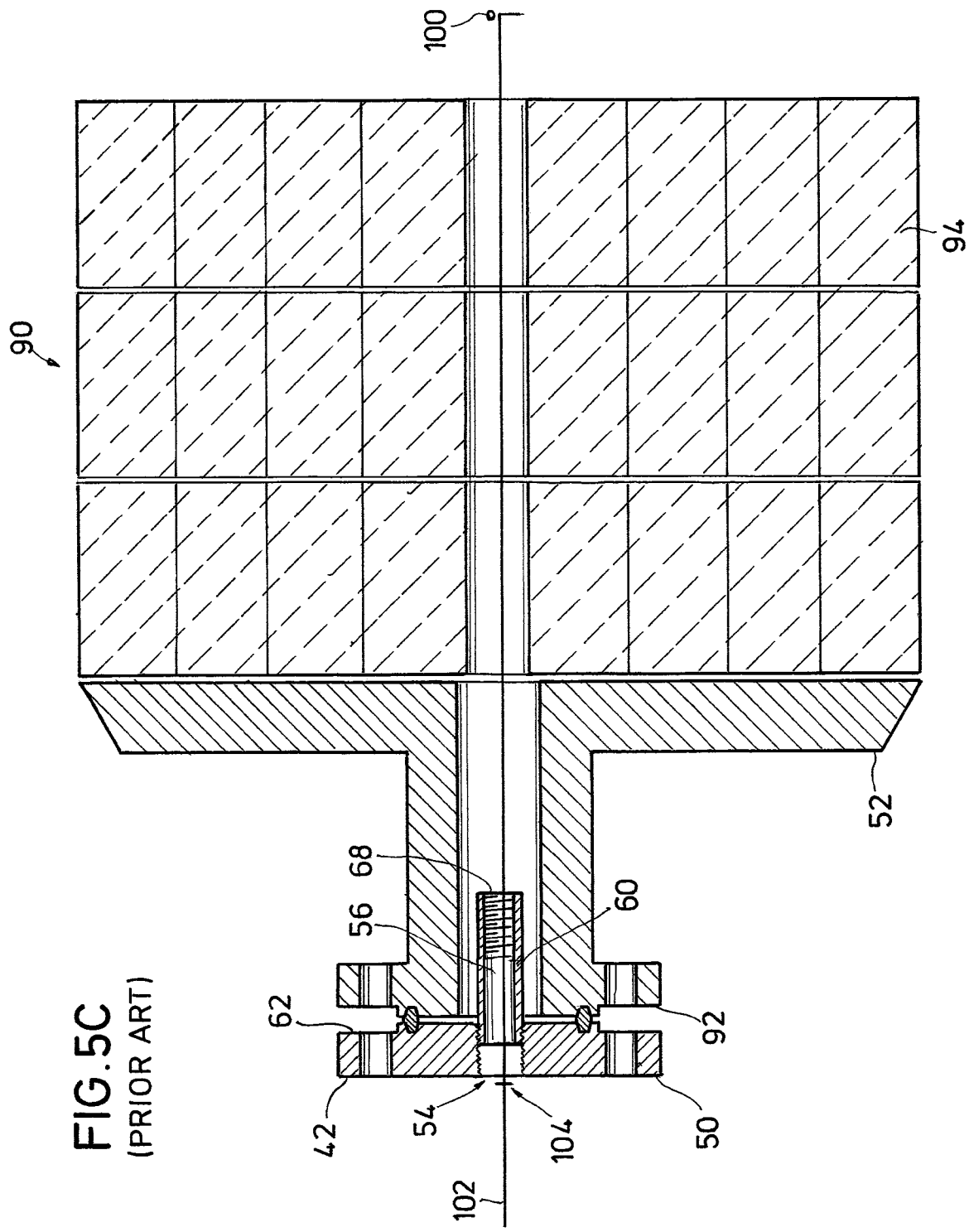

A preferred method of installing the thermocouple-thermowell assembly 10 is shown in FIGS. 5A through 5E. As illustrated in FIG. 5A, the hollow fitting 60 is attached to the internal side 62 of mounting flange 50 prior to its installation into a process unit or machine, such as a gasifier nozzle 90. Next, the mounting flange 50 is installed (FIG. 5B). The precise depth 104 that the thermocouple-thermowell assembly 10 should be positioned from the external side 42 of the mounting flange 50 is determined by measuring the distance using a measuring tape or rod 102 placed through the mounting flange aperture 54, as shown in FIG. 5C. Using the measuring tape or rod 102 as a guide, the precise depth 104 is marked on the thermocouple-thermowell assembly 10 (FIG. 5D). The thermocouple-thermowell assembly 10 is then inserted through the mounting flange 50 until the male threads 24 of metal sleeve 22 engage the left-hand female thread pattern 68 of hollow fitting 60.

The depth of the thermocouple-thermowell assembly 10 is adjusted entirely from outside the process unit 90 by rotating the entire assembly 10 through the mounting flange 50 so that the male threads 24 of metal sleeve 22 thread into the left-hand female thread pattern 68 of hollow fitting 60. As suggested in FIG. 5E, the thermocouple-thermowell assembly 10 is rotated until the precise depth 104 previously marked on the assembly 10 is aligned with the external side 42 of the mounting flange 50. Alternatively, if the thermocouple-thermowell assembly 10 is not marked with the precise depth 104 as previously measured, the depth of the assembly 10 can still be precisely adjusted, because each rotation of the assembly 10 increases the depth by a known amount, such as 0.25 inch. Thus, by simple calculation, the depth of the thermocouple-thermowell assembly 10 can be made to correspond to the desired depth 104 previously measured.

After final adjustment of the thermocouple-thermowell assembly 10, the compression fitting 40, located on assembly 10 on the external side 42 of the mounting flange 50, is moved as by sliding to flange 50 and is threaded into flange 50. The thermocouple-thermowell assembly 10 is then secured in position by threading the male threads 44 on compression fitting 40 into the internal female threads 46 of the mounting flange 50. The fitting cap 30 is then tightened unto fitting 40 to compress the compression fitting ferrule 38 and seal the thermocouple-thermowell assembly 10 to the mounting flange 50. The two-piece ferrule swage-type compression seal 38 disposed between the fitting cap 30 and the male compression seal threads 34 of compression fitting 40 provides the pressure seal between the thermocouple-thermowell assembly 10 and the process unit 90.

Thermowell With Expansion Joint

Figure 5E:
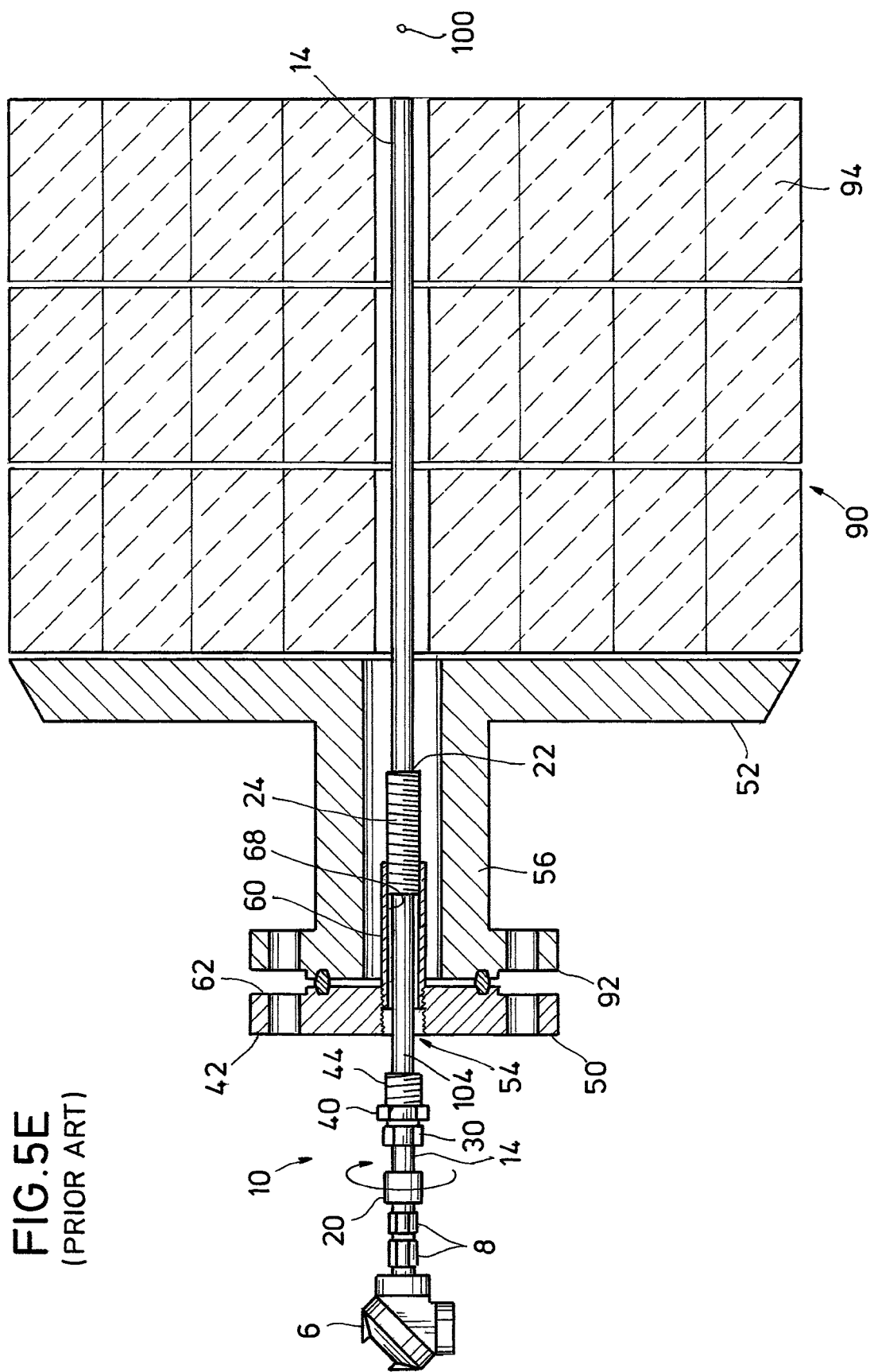

FIG. 5E shows thermowell tube 14 spaced apart from refractory 94 and thus free to move. However, in a slagging type of gasifier, slag can become bound to thermowell tube 14, which fixes or attaches or fuses thermowell tube 14 to the refractory 94. A gasifier goes through thermal cycles, which causes refractory 90 to expand and contract and move in other ways. The thermocouple-thermowell assembly 10 and the thermowell tube 14 generally do not expand and contract the same amount as the refractory 94. Consequently, when the process unit 90 is a slagging type of gasifier or another application in which the thermowell tube 14 can become fixed or fused to the refractory 94, the expansion and contraction of the refractory 94 due to temperature changes can damage the thermowell 14 and the thermocouple-thermowell assembly 10, which can cause the thermocouple-thermowell assembly 10 to fail and no longer provide a temperature measurement.

FIGS. 6A-6F show a side elevation of a thermocouple-thermowell assembly 120 that has an expansion joint 122, which is a bellows 122a. Other than the expansion joint 122, thermocouple-thermowell assembly 120 is the same as thermocouple-thermowell assembly 10, and identical element numbers are used to identify essentially identical elements in thermocouple-thermowell assembly 120 as used in describing thermocouple-thermowell assembly 10. Bellows 122a is a hollow, tubular or cylindrical element that has a sidewall that is convoluted through most of its length but terminates at each end in a tube-shaped neck portion. The convoluted sidewall portion allows the bellows 122a to lengthen/expand; shorten/contract/compress; and bend in a variety of ways. A tube can be welded to each end of bellows 122a to provide the thermowell 14 with the expansion joint 122. In addition to expansion and contraction, which are along the longitudinal axis of the assembly, the convoluted sidewall portion also allows the bellows 122a to move laterally. This allows the tube on one end of the bellows 122a to be non-coaxial with the tube on the other end of the bellows, allowing the axes of the tubes to be parallel or intersecting.

Figure 6D:
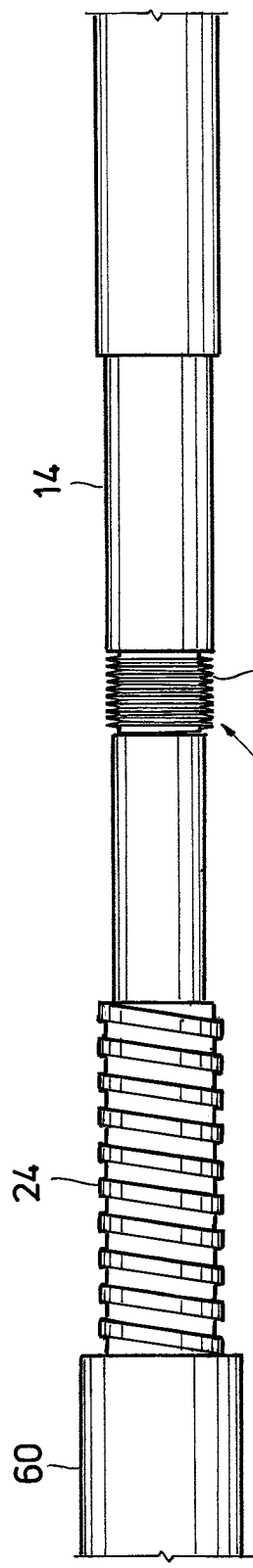
FIG. 6D is a side elevation of the bellows in FIG. 6C in its compressed state.
Figure 6B:
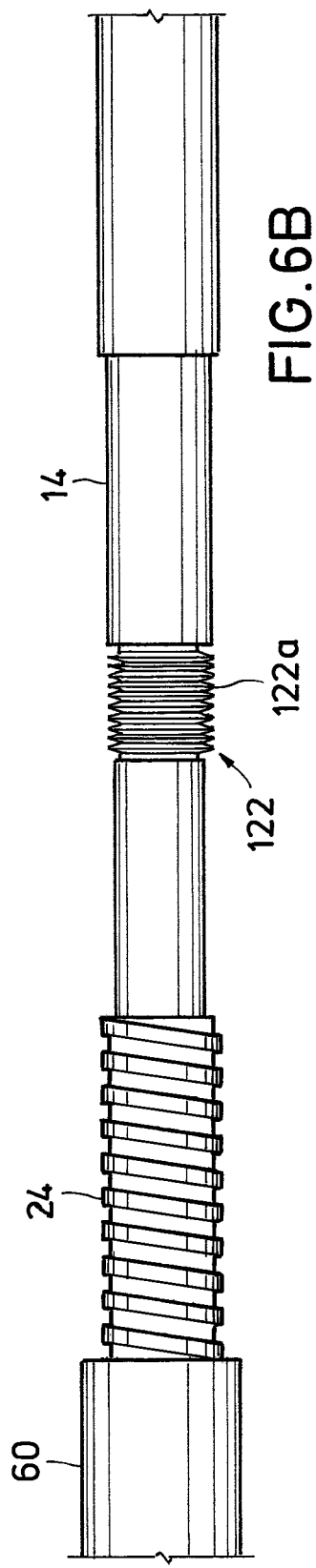
FIG. 6B is a side elevation of the bellows in FIG. 6A, where the bellows are in a normal state.
Figure 6F:
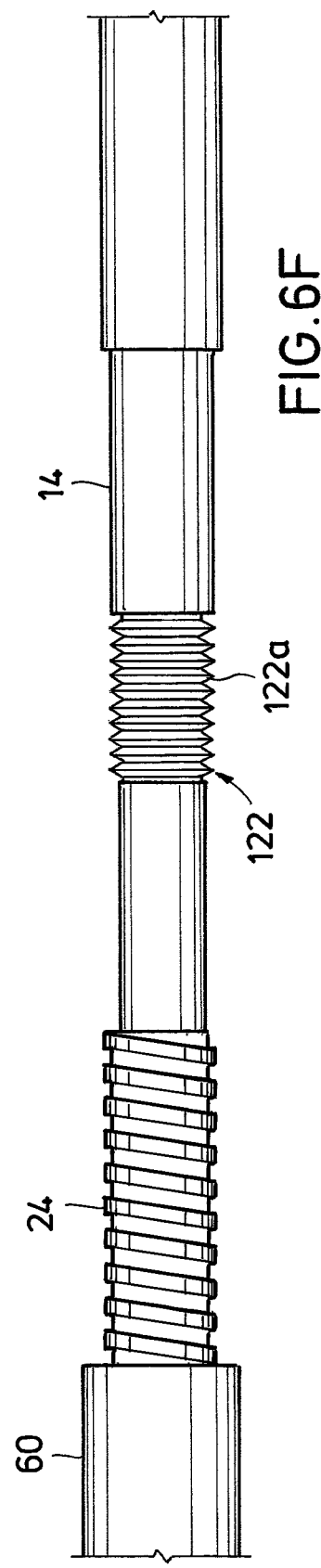
FIG. 6F is a side elevation of the bellows in FIG. 6E in its expanded state.

FIG. 6A shows the bellows 122a in a normal state, where it is at rest and neither expanded nor compressed. FIG. 6B shows a close-up view of bellows 122a in its normal state. FIG. 6C shows the bellows 122a in a compressed state, possibly due to the thermowell 14 having become fused to the refractory 94, and the refractory 94 being at a cooler temperature than normal and in a contracted state. FIG. 6D shows a close-up view of bellows 122a in its compressed state. FIG. 6E shows the bellows 122a in an expanded state, possibly due to the thermowell 14 having become fused to the refractory 94, and the refractory 94 being at a higher temperature than normal and expanded due to the higher temperature. FIG. 6F shows a close-up view of bellows 122a in its expanded state. The expansion joint 122 allows the thermocouple-thermowell assembly 120 to accommodate and tolerate the contraction and expansion of the refractory 94, when the thermowell 14 is fused or otherwise fixed to the refractory 94. The thermowell 14 is often fused or fastened to the refractory during operation of a slagging-type gasifier, and the expansion joint 122 helps to prevent the thermocouple-thermowell assembly 120 from becoming damaged due to expansion and contraction of the refractory 94.

The forces discussed above are along the longitudinal axis of the thermocouple-thermowell assembly 120. The bellows 122a expands or contracts, which allows the thermocouple-thermowell assembly 120 to counter forces along its longitudinal axis. The bellows 122a can also bend, which can be beneficial when the thermocouple-thermowell assembly 120 is subjected to forces transverse to its longitudinal axis. First and second portions of thermowell 14 are welded to opposing ends of bellows 122a. After initial installation, thermowell 14 may be horizontal with each of the first and second portions and the bellows 122a horizontal and coaxial, meaning a common longitudinal axis. After the process unit has been in operation following the initial installation, there may be movement of the refractory that causes the first and second portions to no longer be coaxial. The first and second portions may have parallel axes or the first portion may stay horizontal while the second portion moves into an angle with respect to the first portion. The process end or distal end of the thermowell will likely be fused and fixed to the refractory, and the opposing end or proximal end will be fixed by connection to the mounting flange. Bellows 122a can bend, lengthen, shorten and can also stay the same length as in the initial installation in order to accommodate and tolerate such movement. Bellows 122a can bend in a single curve or a double curve. The process end can move in any direction on an x-y-z coordinate system, while the mounting flange end tends to be more fixed in its initial location, and the bellows 122a can help the thermowell tolerate the different movement of the process end relative to the mounting-flange end so as to help avoid failure of the thermowell assembly. Bellows 122a can also rotate slightly and thus absorb rotational forces to a limited extent. However, bending and rotational forces on bellows 122a can exceed the strength of the material, leading to failure of the bellows 122a and failure of the thermocouple-thermowell assembly 120.

FIGS. 7A-7H show a side elevation of a thermocouple-thermowell assembly 120a, which is identical to thermocouple-thermowell assembly 120, except the expansion joint 122 includes a support sleeve 124 surrounding bellows 122a. FIG. 7A shows the thermocouple-thermowell assembly 120a in a normal state, neither compressed nor expanded. Support sleeve 124 is a tubular element that surrounds bellows 122a and extends distally and proximally beyond bellows 122a. Said in another way, support sleeve 124 is longer than bellows 122a, and bellows 122a is centered between the opposing ends of support sleeve 124. In this embodiment, expansion joint 122 includes bellows 122a and support sleeve 124. Support sleeve 124 has a bore throughout its length since it is a hollow tube, and the bore is defined by the sidewall of the tube. Support sleeve 124 has a hole 124a through its sidewall near one end, and a pin 124b is received in the hole 124a. Pin 124b may be a male-threaded element or screw or bolt received in a mating female-threaded hole in thermowell 14. Alternatively, support sleeve 124 may be welded or otherwise fastened and fixed to thermowell 14 on one side of bellows 122a. Support sleeve 124 has a slot 124c near the end opposing the end that is near hole 124a. A pin 124d is in threaded engagement with thermowell 14 or welded or otherwise attached to thermowell 14. Pin 124d is received in slot 124c. Pin 124d can slide back and forth in slot 124c as bellows 122a changes between normal, compressed and expanded states. The engagement of pin 124d in slot 124c allows not only limited longitudinal expansion and contraction, but also limited bending and rotation of thermocouple-thermowell assembly 120a at expansion joint 122. A hole-and-pin connection for fastening the support sleeve 124 to the thermowell 14 allows adjustability in the amount or degree of stretching, compressing, bending and rotation that the bellows 122a is allowed to absorb. The amount or degree of longitudinal, lateral and rotational movement depends on the length of slot 124c and the tightness, looseness or tolerance of fits between the support sleeve 124 and the thermowell 14; between pin 124b and hole 124a; and between pin 124d and slot 124c. It was said above that support sleeve 124 is fixed on one side of the bellows by pin 124b being engaged in hole 124a or that it may be welded or otherwise fastened and fixed to thermowell 14 on one side of bellows 122a. Alternatively, hole 124a can be a slot or an enlarged hole, and support sleeve 124 can be said to be fixed or fastened to the thermowell tube 14, although the connection is not rigid. An enlarged hole can be covered by a pin that has an enlarged head. There are a variety of ways to provide a controlled range of motion between the support sleeve and the thermowell tube and ultimately between the thermowell tube and the internal tubular fitting or the mounting flange.

FIG. 7A shows the thermocouple-thermowell assembly 120*a* in a normal state, where bellows 122*a* is neither compressed nor expanded. Pin 124*d* is centered along the length of slot 124*c* in support sleeve 124. FIG. 7B provides a close-up view of the expansion joint 122 and the support sleeve 124, while the thermocouple-thermowell assembly 120*a* is in its normal state. FIG. 7C shows the thermocouple-thermowell assembly 120*a* in a compressed state, and FIG. 7D shows a close-up side elevation of a portion of the thermocouple-thermowell assembly 120*a* in which the expansion joint 122 is located, while in its compressed state. Pin 124*d* is pressed against a distal end of slot 124*c*, thereby limiting the amount, degree or extent that bellows 122*a* is compressed, which prevents damage to and failure of the bellows 122*a*. FIG. 7E shows the thermocouple-thermowell assembly 120*a* in an expanded state, and FIG. 7F provides a close-up of expansion joint 122 while in its expanded state. Pin 124*d* is pressed against a proximal end of slot 124*c*, thereby limiting the amount, degree or extent that bellows 122*a* is expanded or stretched, which prevents damage to and failure of the bellows 122*a* that can be caused by overstretching the bellows 122*a*. FIG. 7G shows the thermocouple-thermowell assembly 120*a* in a normal state with a partial cut-away of support sleeve 124 so that the bellows 122*a* is visible. FIG. 7H is a close-up view of the expansion joint 122 with the support sleeve 124 partially cut-away, as shown in FIG. 7G. The following elements of expansion joint 122 can be seen in cut-away FIG. 7H: bellows 122*a*, support sleeve 124, a portion of the sidewall that defines hole 124*a* and slot 124*c*, and pins 124*b* and 124*d*.

Figure 7J:
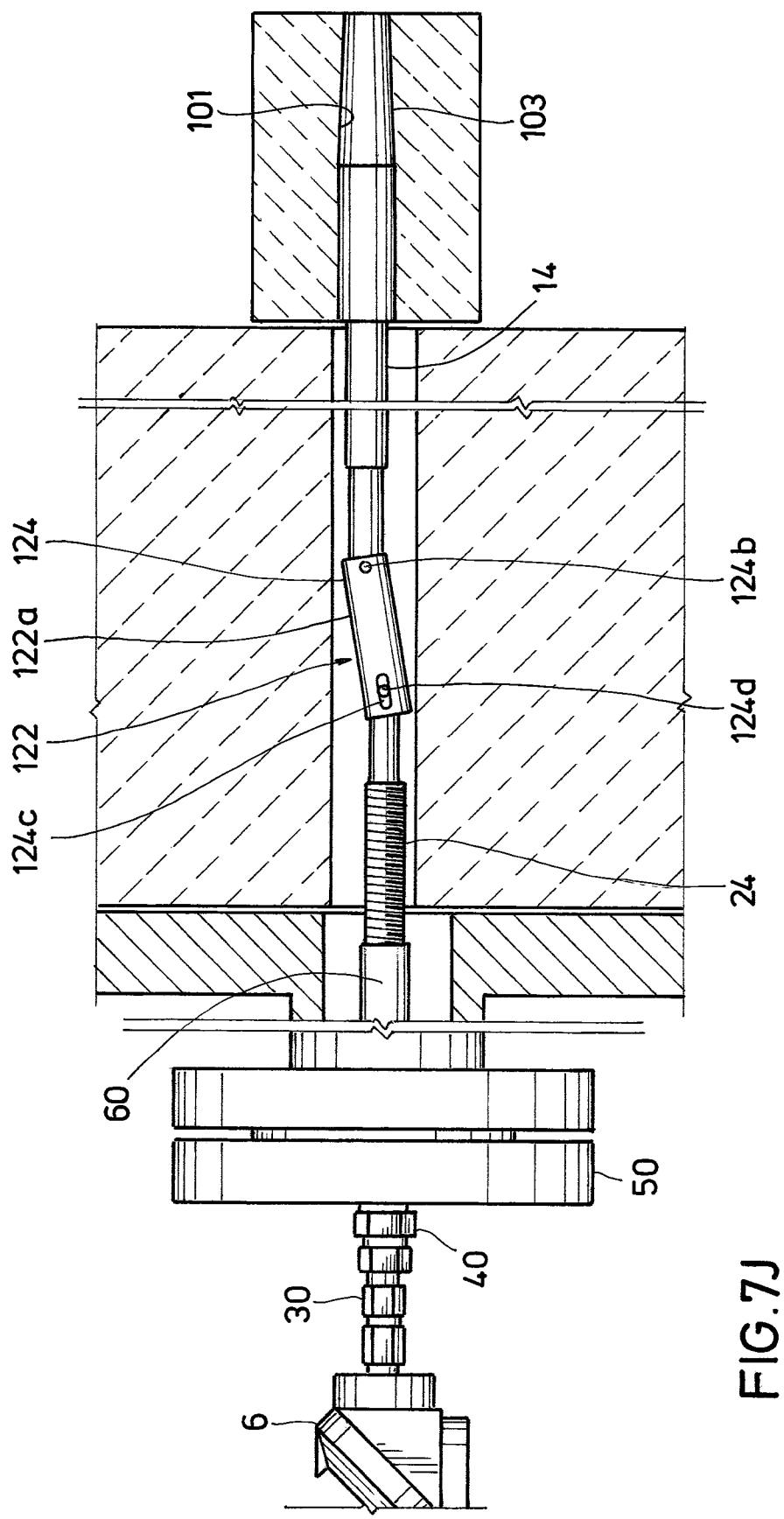
FIG. 7J is a side elevation view of a thermocouple-thermowell assembly installed in a process unit, showing that that the expansion joint allows lateral movement.
Figure 7K:
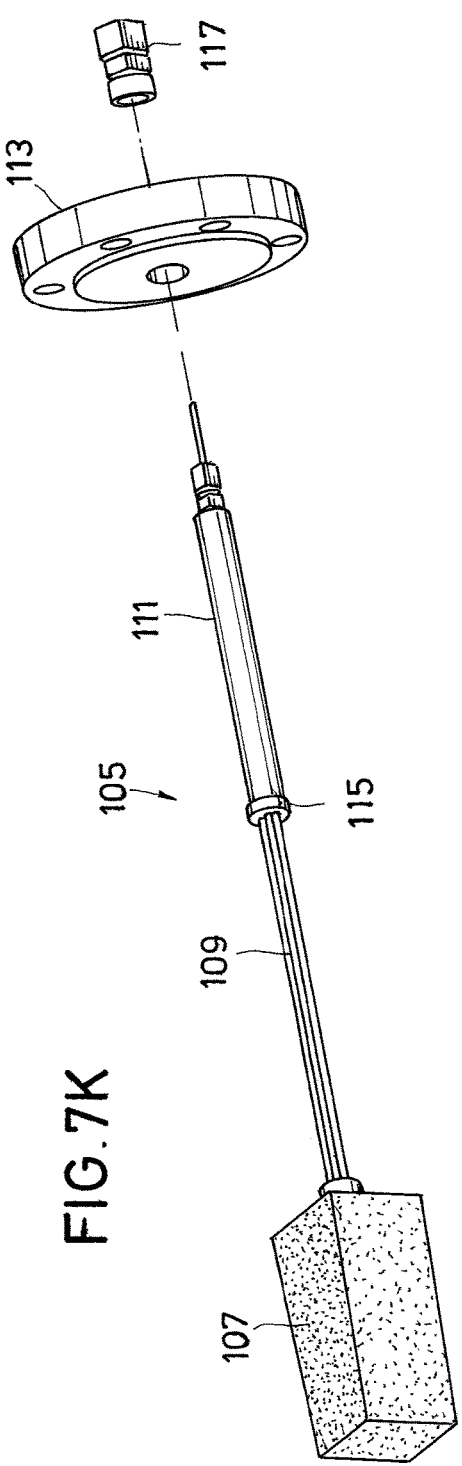
FIG. 7K is a side elevation view of a thermocouple-thermowell assembly terminating at a distal end in a refractory brick, according to the present invention.
Figure 7L:
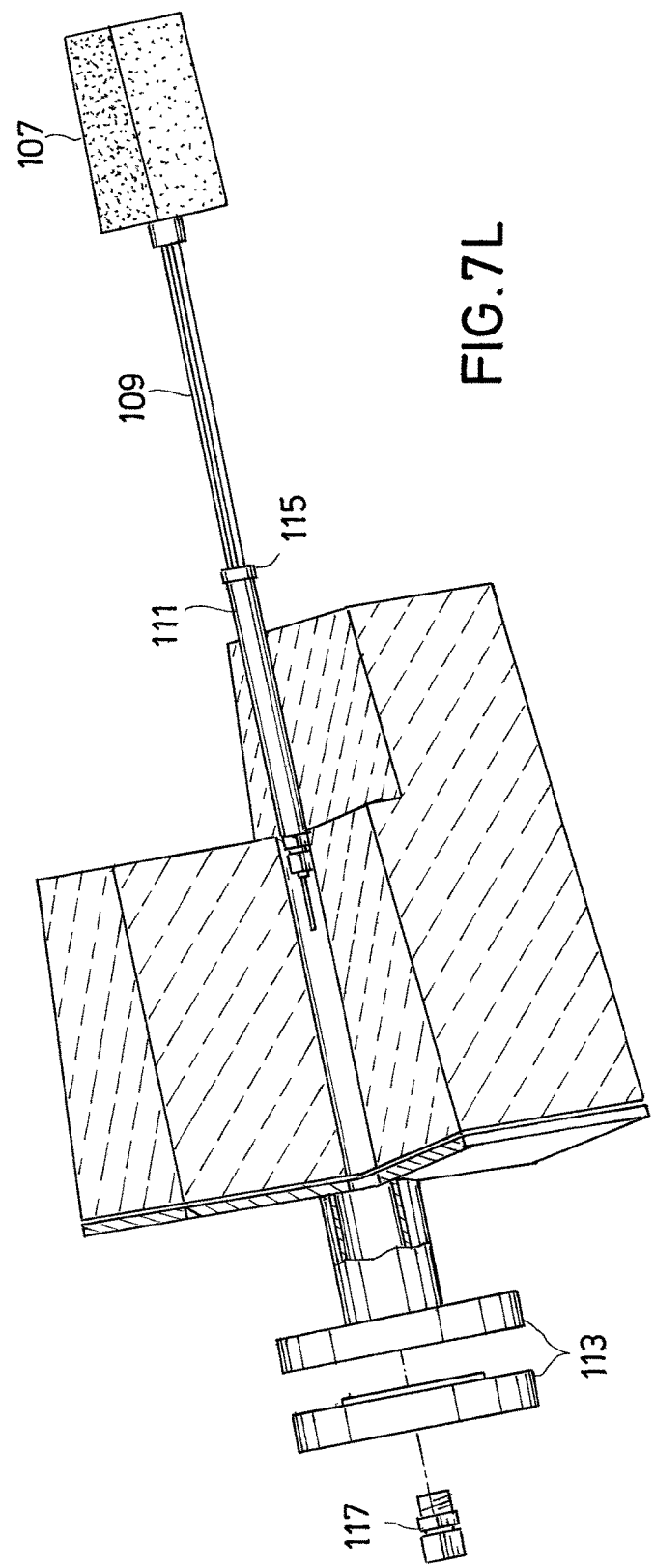
FIG. 7L is a side elevation view of the thermocouple-thermowell assembly of FIG. 7K partially installed in a process unit.

FIG. 7J shows a side elevation of a thermocouple-thermowell assembly that has a bellows surrounded by the support sleeve 124 and shows a double bend that may occur, where the distal and proximal ends of the thermowell have parallel axes, which are not coaxial. In addition to the parallel movement of one portion of a thermowell assembly with respect to another portion of the assembly, which is illustrated in FIG. 7J, a non-parallel shift can also occur. FIG. 7J illustrates an application in which the process end of the thermowell is intentionally fixed in position with respect to the hot face of the refractory. The refractory brick has a conical-shaped hole 101 that tapers smaller towards the interior of the process unit. The process end of the thermowell assembly has a mating conical shape 103 that tapers smaller toward the distal end. A tight fit can be achieved between the conical distal tip of the thermowell and the hot face brick refractory. The tight fit can block radiant heat and can help prevent hot process gas and slag from penetrating into the gaps, cracks and crevices in the refractory, which can reduce the occurrence of hot spots on the outer shell of the process unit. The mating conical shape of the distal end of the thermowell assembly with the refractory brick makes installation to a proper depth very simple. An installer can simply push the thermowell assembly to the full depth of the hole, where a stopping point will be reached at the proper depth. The conical mating of the tip of the thermowell assembly with the conical hole in the refractory brick effectively fixes or fastens the tip to the brick. The proximal end of the thermowell assembly is fixed in position by connection to the mounting flange of the vessel. The distal end of the thermowell assembly is fixed in position by the mating fit of the conical shapes and will likely become further fixed by slag seeping into any crevice between the mating conical shapes. With both the proximal and distal ends of the thermowell assembly fixed in position, the expansion joint moves in length with expansion and contraction of the vessel and the refractory and bends to accommodate and tolerate lateral displacement. The expansion joint can be given further flexibility by replacing the connection at 124*b* with a pin-and-slot connection and by using an enlarged hole with an enlarged head on the pin or screw. Also, it would not be necessary to include a bellows or otherwise provide a seal. The thermocouple assembly has a protective sheath, which at very high temperatures may be a ceramic covering, so the thermocouple assembly can tolerate the high temperature of the process. Without a bellows, the thermowell assembly can include a proximal first tube, a distal second tube and a third tube between and joined to each of the first and second tubes. The third tube can be designed to fit inside of each or one or the other of the first and second tubes. The slot can be in an inside tube or in an outside tube.

FIGS. 7K-7N show an embodiment of a thermocouple-thermowell assembly 105 in which more than one thermowell, in this case three, is received in a hot-face refractory brick 107. As shown in FIG. 7N, the brick 107 is prepared with a deep hole 107*a*, a mid-depth or intermediate hole 107*b* and a shallow hole 107*c* for three thermowells 109*a-c*. The thermowells 109 are arranged in a common plane, which provides greater flexibility for bending to accommodate and tolerate movement of the brick during process operations, thereby serving as a first component of an expansion joint. The three thermowells 109 pass through or terminate in a proximal larger diameter tube 111, which is connected to a mounting flange 113. The three thermowells 109 can slide in and out of the proximal larger diameter tube 111, which provides a second component of the expansion joint. The tube 111 is fitted with a blowout prevention cap 115. Internal stops in the tube limit the movement of the thermowells 109. Some movement of the thermowells within the holes 107*a*, 107*b* and 107*c* in the brick 107 provides another component of the expansion joint. Thermocouple-thermowell assembly 105 thus has a different type of expansion joint than described above for other assemblies, but the arrangement of elements allows and tolerates some expansion, contraction and lateral displacement forces on the thermocouple-thermowell assembly.

Tubes 109 slide within tube 111. Each of the tubes 109 has a larger diameter section near its proximal end, which is trapped inside of the tube 111. This larger diameter section cannot pass through a smaller hole in a distal end of tube 111. Other types of restraints and limiters can be used. The connection or entrapment of tube 109 inside tube 111 provides a linear slide mechanism or another type of slip joint. Three thermowell tubes 109 arranged in a common plane limits rotational movement due to having multiple tubes arranged in a non-concentric orientation. A straight and horizontal orientation of the three tubes 109 accommodates and tolerates forces on the tubes 109 when brick 107 moves vertically. Flange 113 is considered fixed in its position. Brick 107 can move both up and down (vertically) and in/out (longitudinally to/from flange). The straight orientation of three tubes 109 allows for better vertical movement. The slide or slip joint in tube 113 allows for longitudinal length change movement caused by both growth of refractory (brick 107 moving towards/away from flange 113) and by vertical movement of brick 107, which increases the length of thermowell tubes 109 as brick 107 and flange 113 move off of their original longitudinal axis.

A thermocouple in each thermowell 109 provides a separate and independent temperature measurement. A temperature of the process can be calculated with reasonable accuracy using the thermal conductivity of the brick and physical measurements. As the brick 107 is worn away at the hot face along with surrounding refractory, the most distal thermocouple will fail, but the mid-depth thermocouple can then become the primary measurement for calculating and determining the temperature in the process. The thermocouple in the shallow hole can be used after the brick erodes to the point that the mid-depth thermocouple fails. With reference to FIG. 7N, the length of the tube 111 allows for installation of thermocouple-thermowell assembly 105 at different depths into the process vessel, which allows for variability in the thickness of refractory brick. A mounting fitting 117 can slide along tube 111 between a position 117a for installation at a minimum depth and a position 117b for installation at a maximum depth.

FIGS. 8A-8F show a side elevation of a thermocouple-thermowell assembly 120b that has the expansion joint 122, which in this embodiment is a sliding, hexagonal coupling 122b. Other than the expansion joint 122 having a formed hexagonal design, the thermocouple-thermowell assembly 120b is the same as thermocouple-thermowell assembly 120, and identical element numbers are used to identify essentially identical elements in thermocouple-thermowell assembly 120b as used in describing thermocouple-thermowell assembly 120. FIG. 8A is a side elevation of thermocouple-thermowell assembly 120b with the expansion joint 122 in a normal, relaxed state. Thermowell 14 will be described as having a proximal portion 14a and a distal portion 14b. The proximal portion 14a has the male threads 24, which were described with reference to FIG. 1. In one embodiment, proximal portion 14a of thermowell 14 is machined to have a hexagonal outer surface near its distal end, which is the end opposite of the end that receives the thermocouple head 6. The distal end of the proximal portion 14a is left at its original size and shape, which leaves a shoulder or flange on the distal end. The machined hexagonal outer surface near the distal end has a smaller diameter than the shoulder or flange at the distal end. The proximal portion 14a of thermowell 14 is a male portion of the hexagonal coupling 122b, which, alternatively, can be made in a crimping operation or in a combination of machining and crimping. The distal portion 14b of the thermowell 14 has a hexagonal shape that has an inside diameter slightly larger than the diameter of the shoulder or flange on the distal end of the proximal portion 14a. The hexagonal shape of the distal portion 14b of the thermowell 14 is preferably formed by crimping.

FIG. 8B is a close-up view of the expansion joint 122 in FIG. 8A. All of FIGS. 8A-8F show the thermocouple-thermowell assembly 120b after assembly. Thermowell 14 in FIGS. 8A-8F is assembled by sliding the distal portion 14b of the thermowell 14 over the shoulder or flange at the distal end of the proximal portion 14a of thermowell 14. The proximal end of the distal portion 14b of the thermowell 14 is crimped using a crimping machine that provides a hexagonal shape that matingly fits over and slides back and forth on the hexagonal outer surface near the distal end of the proximal portion 14a. The crimped proximal end of the distal portion 14b has an inside diameter that is slightly greater than the diameter of the hexagonal outer surface near the distal end of the proximal portion 14a and slightly smaller than the shoulder or flange on the distal end of the proximal portion 14a. The crimped proximal end of the distal portion 14b of thermowell 14 is trapped after crimping and is sized and designed to provide a limited range of back-and-forth or longitudinal sliding motion. The hexagonal cross-section where the distal portion 14b slidingly engages the proximal portion 14a of thermowell 14 tends to counter a rotational force applied to the thermowell 14. The sliding, hexagonal coupling 122b of this embodiment of the expansion joint 122 comprises the proximal portion 14a and its shoulder or flange at its distal end and the distal portion 14b and its crimped proximal end, which becomes trapped over the hexagonal portion of proximal portion 14a between the original-size portions of thermowell 14 on each end of the hexagonal portion after crimping.

FIGS. 8C and 8D show the sliding, hexagonal coupling 122b in a compressed state, where the hexagonal part of the proximal portion 14a is completely covered by the hexagonal part of distal portion 14b. FIGS. 8E and 8F show the sliding, hexagonal coupling 122b in an expanded state, where the proximal end of the hexagonal part of the distal portion 14b is stopped by or is in contact with or abuts the shoulder or flange on the distal end of the proximal portion 14a of thermowell 14. The shoulder or flange on the distal end of the proximal portion 14a of thermowell 14 is not visible in the drawings because it is surrounded by the uncrimped or transition portion of distal portion 14b of thermowell 14. The hexagonal shape of sliding, hexagonal coupling 122b limits rotational movement while allowing linear or longitudinal or axial movement. Other non-fully circular shapes can be used to limit rotational movement such as oval, square, triangle and a double-oval such as found in the number 8.

Figure 9D:
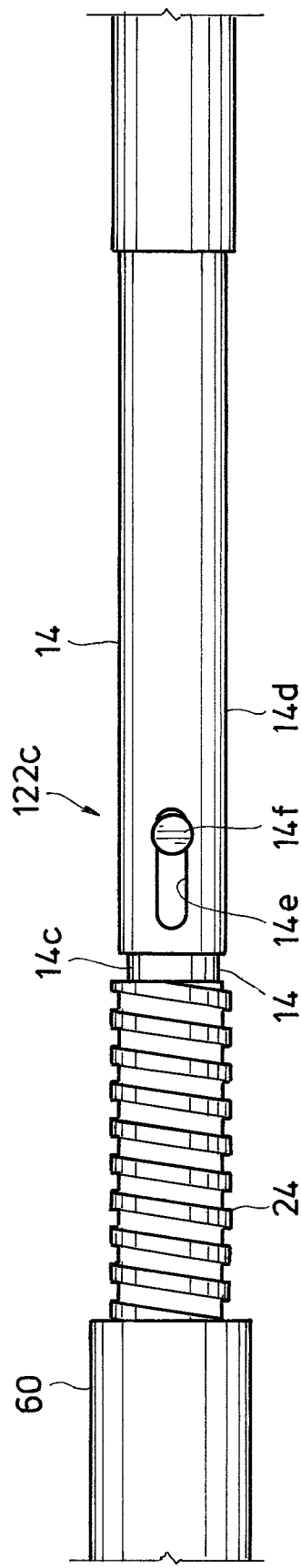
FIG. 9D is a side elevation of the coupling in FIG. 9C in its compressed state.
Figure 9B:
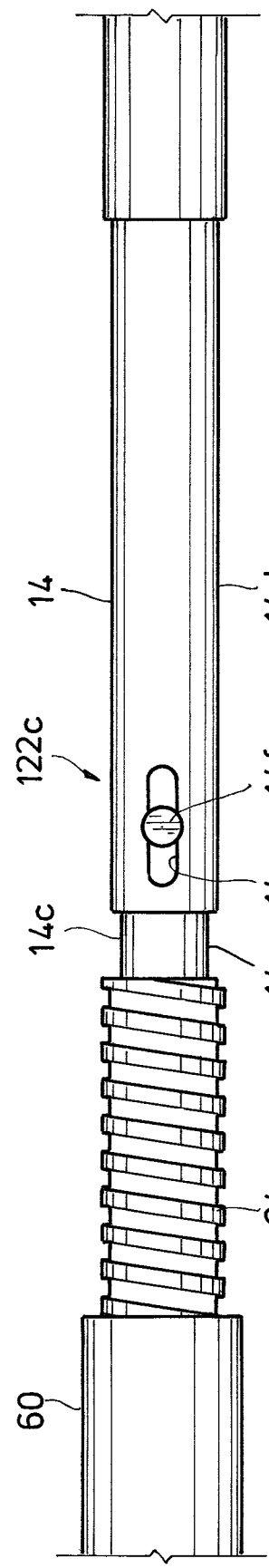
FIG. 9B is a side elevation of the coupling in FIG. 9A in its normal state.
Figure 9F:
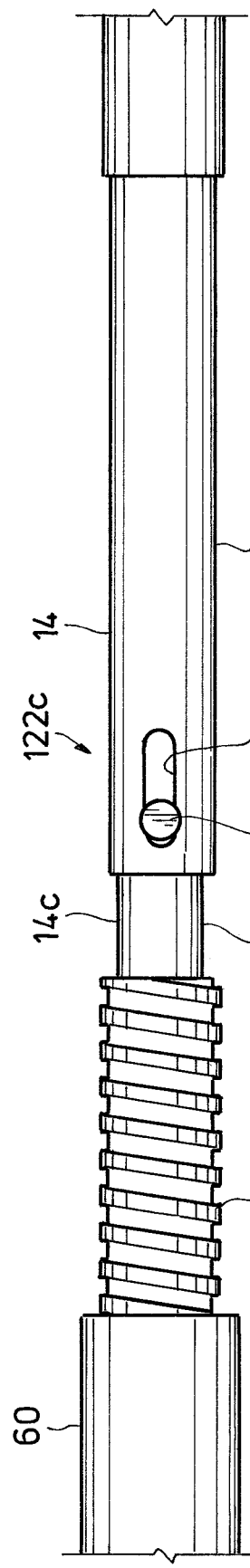
FIG. 9F is a side elevation of the coupling in FIG. 9E in its expanded state.

FIGS. 9A-9F show a side elevation of a thermocouple-thermowell assembly 120c that has the expansion joint 122, which in this embodiment is a pin and slot coupling 122c. FIG. 9A shows thermocouple-thermowell assembly 120c in a normal, relaxed state, and FIG. 9B is a close-up view of coupling 122c in the normal, relaxed state. Thermowell 14 in this embodiment comprises a male proximal portion 14c and a female distal portion 14d. The male proximal portion 14c has a smaller outside diameter than the inside diameter of female distal portion 14d. The female distal portion 14d slides over and back and forth on the male proximal portion 14c. The female distal portion 14d has a longitudinal slot 14e. A pin 14f is fastened or fixed to male proximal portion 14c, such as by threaded engagement with a threaded hole in the male proximal portion 14c or by welding. FIG. 9C shows thermocouple-thermowell assembly 120c in a compressed state, and FIG. 9D is a close-up view of coupling 122c in its compressed state. FIG. 9E shows thermocouple-thermowell assembly 120c in an expanded state, and FIG. 9F is a close-up view of coupling 122c in its expanded state. The length of the slot 14e determines the limits for longitudinal movement, typically due to thermal expansion and contraction when the process end of the thermowell 14 is fixed in position such as being fused due to slag or some mechanical deformation of the refractory 94. The tightness of the fit of the pin 14f in the slot 14e will generally determine the amount, the degree and the extent of any lateral bending or flexing motion or movement and any rotational motion or movement of the female distal portion 14d with respect to the male proximal portion 14c. The thermocouple-thermowell assembly shown in FIGS. 9A-9F can also include a bellows, either inside a tube or exposed.

Figure 10A:
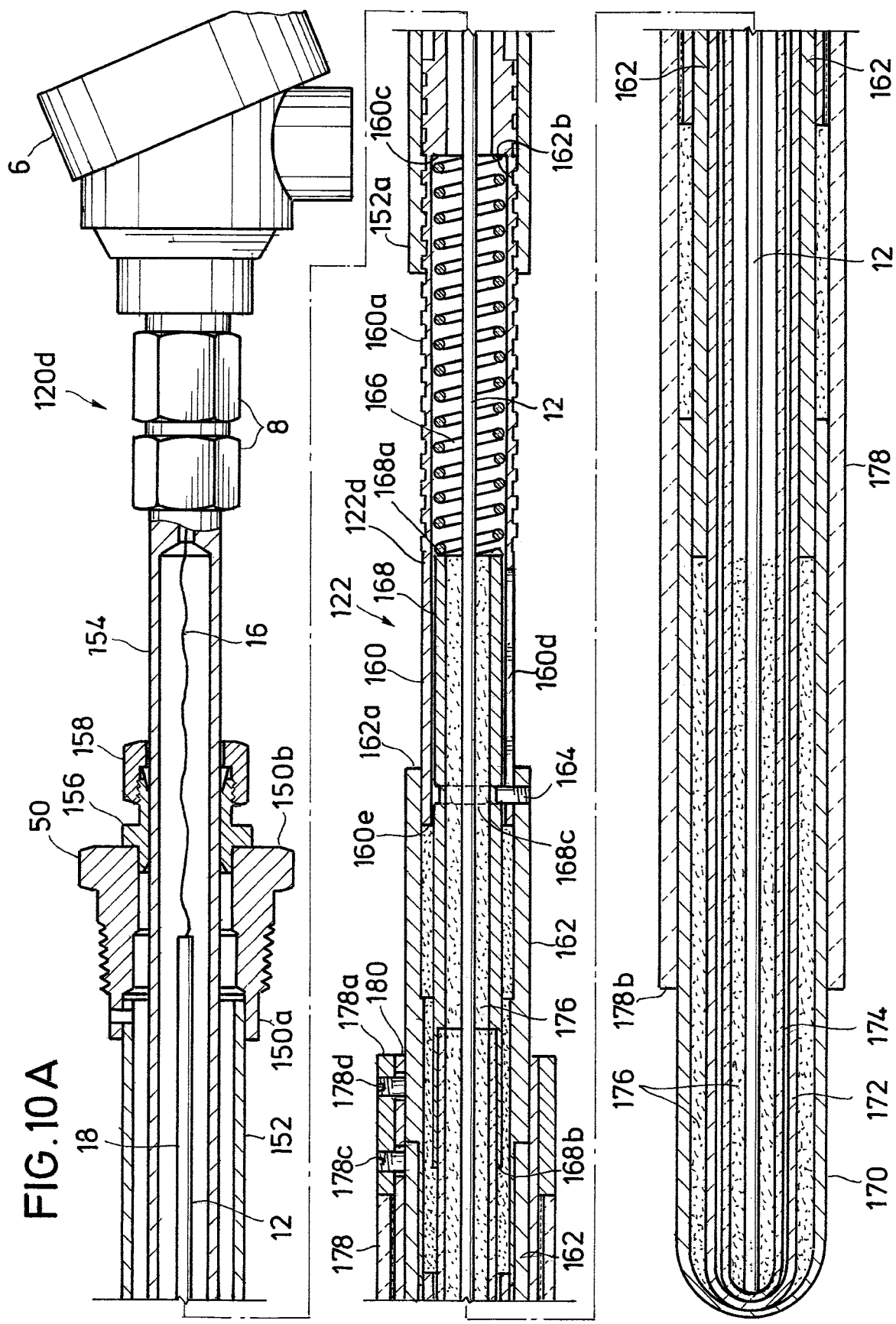
FIG. 10A is a side elevation view of a preassembled thermocouple-thermowell assembly that has a spring-loaded expansion joint, which includes a pin-and-slot coupling, a plunger and a spring in a relaxed state, according to the present invention.
Figure 10B:
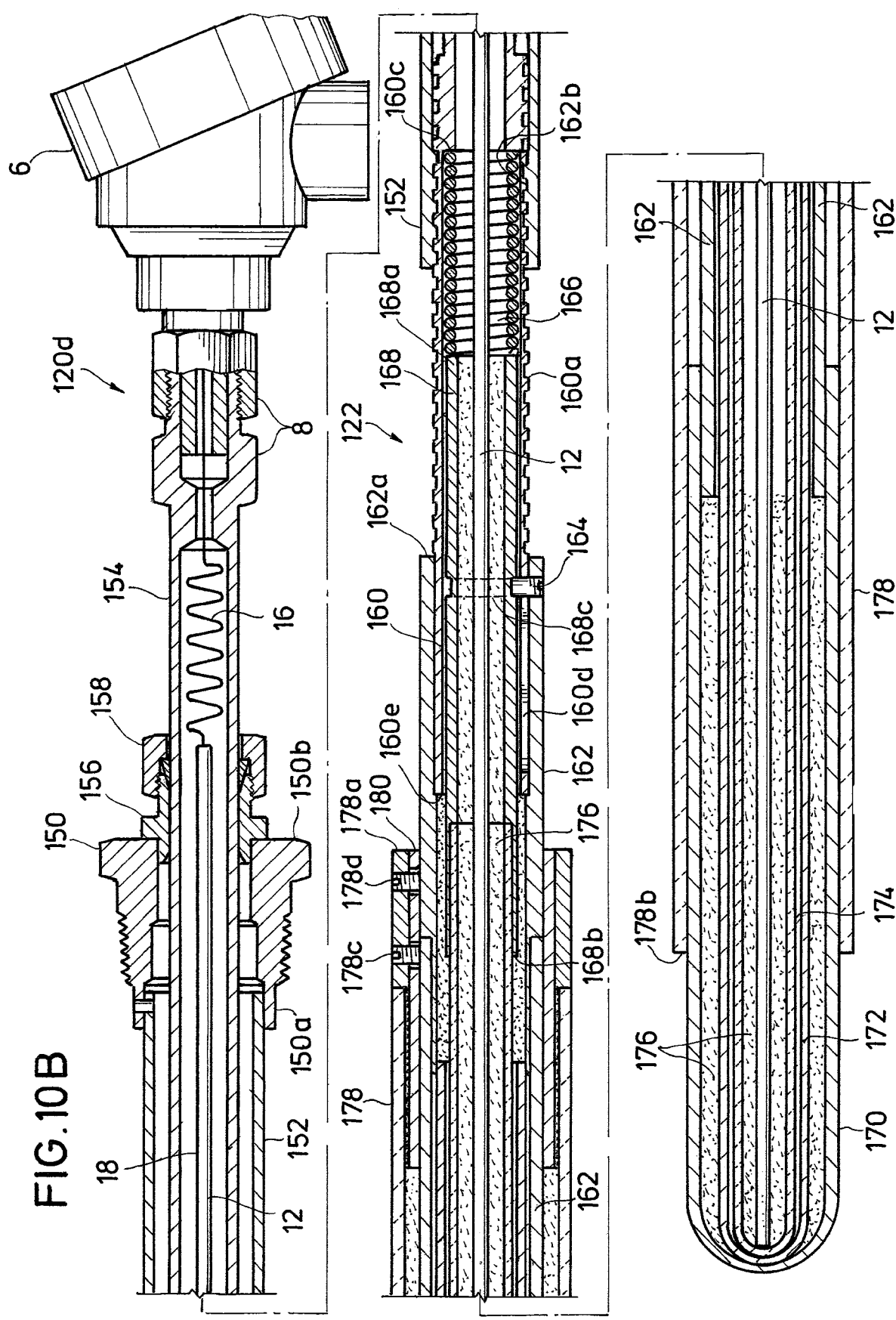
FIG. 10B is a side elevation of the thermocouple-thermowell assembly of FIG. 10A with the spring in a compressed state.

FIGS. 10A and 10B show side elevations in partial cross-section of a thermocouple-thermowell assembly 120d that has the expansion joint 122, which in this embodiment is a spring-loaded pin and slot coupling 122*d*. FIG. 10A shows the spring in a relaxed state. The spring is compressed in FIG. 10B. A mounting flange bushing 150 can be threaded into a mounting flange (not shown) for fastening and sealing thermocouple-thermowell assembly 120*d* to a process vessel, furnace, machine or somewhere else in which a temperature is to be measured. Mounting flange bushing 150 has a distal end 150*a* that extends into the interior of the mounting flange and a proximal end 150*b* that is outside of the mounting flange. An internal tubular fitting 152 is engaged with or fixed to the distal end 150*a* of the bushing 150. Internal tubular fitting 152 may or may not have a circular cross-section in either its outside diameter or in its inside diameter. An inner thermowell tube 154 is received in the bores of the bushing 150 and the internal tubular fitting 152. A flanged nipple 156 and a cap 158 are used to fasten and seal the inner thermowell tube 154 to the mounting flange bushing 150. The thermocouple assembly 12, which comprises thermocouple elements or wires 16 preferably encased in protective ceramics 18, is received in the bore of the inner thermowell tube 154. Thermocouple head 6 is fastened to and sealed with the inner thermowell tube 154 by thermocouple seal 8.

A distal end 152*a* of the internal tubular fitting 152 has female threads 152*b*. A male tubular fitting 160, which is a modified version of sleeve 22 with its male threads 24 in FIG. 1, has male threads 160*a* on a proximal end 160*b*, which are in threaded engagement with the female threads 152*b* of the internal tubular fitting 152. Male threads 160*a* may be reverse or left-hand threads for preventing back-out. Male tubular fitting 160 has been bored, which provides two different inside diameters, thereby providing a shoulder 160*c*. Male tubular fitting 160 has a longitudinal slot 160*d* near a distal end 160*e*. There are three slots spaced evenly around the circumference of the male tubular fitting 160, but only one is shown in this cross-section. A first protective tube 162 has a proximal end 162*a* surrounding the distal end 160*e* of the male tubular fitting 160. A screw 164 is in threaded engagement with the first protective tube 162 and extends into the longitudinal slot 160*d* in the distal end 160*e* of the male tubular fitting 160. There are three screws, one for each of the three slots spaced evenly around the circumference of the male tubular fitting 160, but only one screw is shown in this cross-section. The first protective tube 162 is in sliding engagement with the male tubular fitting 160, which allows the first protective tube to move longitudinally back and forth with respect to the male tubular fitting 160 and with respect to the internal tubular fitting 152 and with respect to the mounting flange. The male tubular fitting 160, the internal tubular fitting 152 and the mounting flange are connected together rigidly and do not move any substantial amount. However, the sliding engagement of the first protective tube 162 with the male tubular fitting 160 accommodates longitudinal movement and to some extent non-longitudinal movement in the thermowell-thermocouple assembly 120*d*. The expansion joint 122*d* comprises the pin-and-slot connection provided by the screw 164 being engaged in the first protective tube 162 and extending into the slot 160*d* of the male tubular fitting 160.

Expansion joint 122*d* further comprises a spring 166 and a tubular plunger 168, although neither is required. Plunger 168 has a proximal end 168*a* and an opposing distal end 168*b*. Spring 166 is trapped between the proximal end 168*a* of the plunger 168 and the shoulder 160*c* in the male tubular fitting 160. The shoulder 160*c* can be replaced by using a distal end of the inner thermowell tube 154 as an abutment for the spring 166. Spring 166 is shown in a relaxed state in FIG. 10A and in a compressed state in FIG. 10B. FIG. 10B shows the first protective tube 162 having moved from the distal end of the slot 160*d* to the proximal end of the slot 160*d* of the male tubular fitting 160. The spring 166 pushes the distal end of the thermowell-thermocouple assembly away from the mounting flange. The length of the slot 160*d* determines the extent to which the first protective tube 162 can move longitudinally with respect to the male tubular fitting 160. Expansion joint 122*d* can also provide some flexing and bending transverse to the longitudinal axis of the thermowell assembly, depending on how tightly the first protective tube 162 is slidingly engaged with the male tubular fitting 160. No pressure seal is provided between the first protective tube 162 and the male tubular fitting 160. Pressure and temperature inside the thermowell tube equilibrates with pressure and temperature outside the thermowell tube. A seal such as an O-ring or a packing can be used, if desired for a particular application.

The expansion joint 122*d* is essentially a sliding connection between first and second portions of a thermowell assembly. The thermowell assembly includes an internal tubular fitting fixed directly or indirectly to a mounting flange on a process vessel, a machine or any industrial equipment in which it is desired to measure a temperature inside. In one embodiment, a first tube is in a threaded engagement with the internal tubular fitting, and a second tube is movably engaged with the first tube. In this embodiment, the first tube has a longitudinal slot, and the second tube has a pin extending through the slot. The second tube can move axially with respect to the first tube. In another embodiment the assembly further includes a spring inside the first tube, and a plunger is received in the first and second tubes. The pin in the second tube is engaged with the plunger, which is in direct or indirect contact with the spring, which exerts a force on the plunger directly or indirectly. For example, if the second tube is moved toward the mounting flange and then becomes free to move away from the mounting flange, the spring can provide a force for helping to move the second tube away from the mounting flange. In FIGS. 10A and 10B, plunger 168 has a circumferential groove 168*c*, and screw 164 extends into the groove 168*c*. The plunger can instead have a hole to receive the screw, but it is easier to assemble with a groove than a hole. A spring and/or a bellows can possibly be incorporated into the embodiments that do not have a spring and/or into embodiments that do not have a bellows. A slot can be in an inside tube or in an outside tube. There are design alternatives to the pin-and-slot engagement such as a channel with a ball bearing.

With reference to FIGS. 10A and 10B, in this particular embodiment, the hot end of the thermowell assembly includes several layers of protective tubes for keeping the thermocouple assembly from becoming damaged. The first protective tube 162 is cemented to an outer enclosed protective tip 170. A middle protective tube 172 is cemented to and inside of the first protective tube 162. An inner protective tube 174 is cemented to and inside of the middle protective tube 172. The thermocouple assembly 12 is received inside the inner protective tube 174 with the distal end of the thermocouple assembly pressed against the inside of the enclosed tip of the distal end of the inner protective tube 174. A cement 176 suitable for a high-temperature ceramic application fills the voids between the protective tubes and bonds and attaches the thermocouple assembly 12 to the inside wall of the inner protective tube 174. The thermocouple assembly 12 moves with the thermowell assembly of protective tubes 162, 170, 172 and 174.

For the particular embodiment of the invention shown in FIGS. 10A and 10B, a fire brick and refractory inside a vessel preferably has a tubular hole extending from the mounting flange to a hot face of the refractory on the inside of the vessel. The hole preferably has a smaller diameter proximate to the hot face of the refractory, possibly 2-4 inches or 5-10 cm long, and a larger diameter from that point to the mounting flange, thereby providing a shoulder within the refractory bore. In this embodiment, a backstop sleeve 178 having a proximal end 178a and a distal end 178b is received around the outside of the first protective tube 162 and the outer protective tip 170. The distal end 178b of the backstop sleeve 178 abuts the shoulder within the refractory bore, which is 2-4 inches or 5-10 cm from the hot face of the refractory. If one knows the length of the smaller-diameter bore in the refractory, then that length can be matched with the distance between the distal end of the outer protective tip 170 and the distal end 178b of the backstop sleeve 178. One slides the backstop sleeve 178 over the outer protective tip 170 and into a position that provides the desired length between the distal end 178b of the backstop sleeve 178 and the distal end of the outer protective tip 170. One then fastens the backstop sleeve to the first protective tube using screws 178c and 178d, preferably three pairs of such screws spaced around the circumference. There is a gap between proximal end 178a of the backstop sleeve 178 and the first protective tube 162. This gap is preferably eliminated using a spacer bushing 180, which one slides over the outer protective tip 170 before sliding the backstop sleeve 178 over the outer protective tip 170.

One application in which thermowell-thermocouple assembly 120d may be used is in a slagging-type of gasifier. In this application, slag generally seeps into the refractory bore hole around the outer protective tip 170 and hardens and bonds the outer protective tip 170 to the refractory at and near the hot face of the refractory. The refractory expands as the gasifier is heated to its operating temperature and contracts as it cools down. Refractory and fire bricks can slump and shift. If the outer protective tip 170 is fixed or fastened or bonded to the refractory, then expansion, contraction, shifting and slumping of the refractory can damage a rigid thermocouple-thermowell assembly and cause a loss of temperature measurement by the assembly. As stated above, the first protective tube 162 is cemented to an outer enclosed protective tip 170. The expansion joint 122d of the thermowell-thermocouple assembly 120d, or any of the thermowell-thermocouple assemblies with expansion joints 122 described above, allows the outer protective tip 170 to move, particularly longitudinally due to the sliding engagement between the first protective tube 162 and the male tubular fitting 160, with respect to the fixed position of the male tubular fitting 160 to the internal tubular fitting 152, which is fixed directly or indirectly to a mounting flange on a nozzle on the shell of the process vessel or gasifier vessel.

Since the distal end or hot end of a thermowell-thermocouple assembly is likely to become attached to the refractory by slag, one can instead purposefully fix or fasten the distal end of the assembly to the refractory near the hot face of the refractory. The distal end or hot end of the assembly can be fastened to the refractory using a cement suitable for the high-temperature application. The distal end or hot end of the thermowell-thermocouple assembly can be fixed in a fire brick such as illustrated in FIGS. 7K-7N, and the fire brick can be laid in as the refractory is built or cemented in. A conical-shaped brick can be received in a mating bore hole in the refractory. A method for measuring temperature in a vessel or a machine or a furnace or in other industrial equipment is thus described that includes the steps of: (1) fixing the hot tip or distal end of a thermowell-thermocouple assembly at or near a point where a temperature is to be measured; (2) fastening the cold end or proximal end of the thermowell-thermocouple assembly to a mounting structure at the external surface of the vessel or machine or furnace or other industrial equipment; and (3) using a thermowell-thermocouple assembly that has an expansion joint, such as described herein, to measure temperature at the hot tip or distal end of the thermowell-thermocouple assembly.

Six embodiments of the expansion joint 122 have been described, namely unsupported bellows 122a, supported bellows 122a that have the support sleeve 124, the sliding, hexagonal coupling 122b, the pin and slot coupling 122c, the spring-loaded, pin-and-slot sliding connection of expansion joint 122d, and the sliding entrapment of thermowell tubes 109 inside of the tubular fitting 111 in FIG. 7N. The expansion joints described are slip joints of different designs, except for the bellows. In slip joints, one portion of a thermowell tube, including the internal tubular fitting 60, slips and slides within another portion of the thermowell tube, and a mechanism is used to keep the two pieces from coming apart and to define the allowed length of axial movement. A longitudinal slot in a first piece, which has a certain length, can define the allowed length of axial movement, and a pin fixed to the second piece and protruding into the slot in the first piece keeps the second piece engaged with the first piece. The hexagonal coupling 122b and the entrapped tube 109 in the tubular fitting 111 in FIG. 7N are examples of another type of slip joint in which a smaller-diameter tube slides back and forth in a larger diameter tube, but either an enlarged portion of the smaller diameter tube or a shrunken portion of the larger diameter tube causes the smaller diameter tube to become trapped in the larger diameter tube. A crimp in the hexagonal coupling 122b can be used to shrink the diameter of a tube. Machining can be used to reduce the wall thickness of a tube in one portion of the tube, while leaving the original thickness at another portion to provide a shoulder. A ring can be added around a tube to provide an enlarged portion. Other features can be added. For example, if it is desired to limit rotational movement, a spline can be used that allows slippage along a longitudinal axis, but ridges on one piece received in corresponding grooves on the other piece inhibit rotational movement.

The unsupported and supported bellows provide an integral, continuous thermowell tube, which does not require a seal or packing to isolate the interior of the thermowell from process fluids in the process unit. The sliding, hexagonal coupling 122b and the pin and slot coupling 122c comprise two separate pieces, where one piece slides with respect to the other piece, and where the thermowell comprises the two pieces. A seal can be used between the two pieces to isolate the interior of the thermowell from process fluids in the process unit, but may not be required. Typical seals include O-rings and packing suitable for a harsh, hot environment in a gasifier. A seal is not required since the thermocouple assembly 12 includes a protective ceramic covering 18 to protect the thermocouple wires 16. The pin-and-slot connections of expansion joints 122c and 122d do not include a seal.

Characteristics for a useful thermowell assembly according to the present invention include the following: (1) means for connecting the thermowell assembly to a mounting structure associated with the end-use application where a temperature is to be measured or where another type of sensor is to be located, and an internal tubular fitting that connects to a mounting structure is one example, where the tubular fitting has a bore for receiving a thermocouple or other sensor assembly, where the cross-section can have a shape other than circular; (2) means for protecting the thermocouple or other sensor assembly from harsh conditions in the end-use application, where those conditions have been described as high temperature but can instead be conditions such as a liquid acidic environment or an abrasive environment from flowing particles; and (3) means for accommodating forces exerted on the thermowell assembly, where those means are described generally as an expansion joint of any type that provides a non-rigid connection between two portions of the thermowell assembly or between the thermowell assembly and the mounting structure. Means for connecting the thermowell assembly to a mounting structure include threading, welding, bolting, bonding and heating for expansion followed by cooling for contraction in a tight mechanical connection. Means for protecting the thermocouple or other sensor assembly include a variety of protective sheaths. U.S. Pat. No. 3,146,299, which issued to Norton on Aug. 25, 1964, describes a mineral filled insulated cable or MI cable, and the patent and technical literature describe many advancements on this concept of a protective sheath. U.S. Pat. No. 4,510,343, which issued to Sivyer on Apr. 4, 1985, and prior art cited herewith describe various designs used to protect a thermocouple or other sensor assembly.

Non-rigid means for accommodating forces exerted on the thermowell assembly and allowing differential movement between portions of the thermowell assembly or between the thermowell assembly and the mounting structure are referred to generally as an expansion joint. There are an endless number of variations for expansion joints in addition to the expansion joints described herein. Alternative expansion joints include connections that allow for linear sliding based on non-restrictive geometry and with limited rotary movement based on restrictive geometry. Linear slide bearings can be used in a thermowell tube. It is not necessary for a thermowell tube to have a circular cross-section. A tube having a square or rectangular cross-section can be used, which may be an easier shape for implementing a linear slide bearing. Linear slide bearings are described in U.S. Pat. No. 2,672,378, which issued to McVey on Mar. 16, 1954; U.S. Pat. No. 4,253,709, which issued to Teramachi on Mar. 3, 1981; and U.S. Pat. No. 3,778,120, which issued to Hagen et al. On Dec. 11, 1973. A balled-slot or a ball-and-slot design is another type of expansion joint. A slot is cut or formed on the outside of an inner tube having any desired cross-section and a slot is cut or formed on the inside of an outer tube, and a ball or a ball bearing is received between the two slots, preferably fitting in a round shape that is formed when the two slots are aligned and adjacent to each other. The movement range would be approximately two times the slot length less the ball diameter. A variation on this concept is a geared-slot design. A small gear, such as a spur gear, is used instead of a ball bearing, and rack-type mating slots are cut or formed on the tubes. Another expansion joint can use a pinned-slot design. A pin is laid down in the center diameter between an inner and an outer tube instead of a ball. The pinned-slot design provides stronger rotary resistance than the balled-slot design, but provides less range of motion, where both are based on the length of the pin.

Turning now to the temperature measurement device, the thermocouple assembly 12 was described above with reference to FIG. 2B. With reference to FIGS. 2A and 2B, thermocouple assembly 12 comprises thermocouple elements or wires 16, which are enclosed in protective sheath 18, which is preferably a ceramic material. Fitting 20 is welded to thermowell 14 or otherwise formed as part of the thermowell assembly 14. The thermocouple assembly 12 is placed inside the thermowell assembly 14. Thermocouple seal 8 is placed over the proximal end of the thermocouple assembly 12 and threaded into fitting 20, thereby providing a seal around the thermocouple assembly 12 that will prevent process gasses from leaking from inside the process unit through the thermocouple assembly 12 in the event that the thermowell 14 is damaged and loses its seal. Head 6 is connected to thermocouple seal 8, possibly through a nipple or indirectly through an armored cable, and the thermocouple wires 16 are terminated in head 6.

It is preferable, although not necessarily required, that the thermocouple assembly 12 expand and contract with the thermowell 14. If the thermocouple assembly 12 is not in a fixed position with respect to the thermowell 14, then the thermocouple assembly 12 can expand and contract differently and separately from thermowell 14. However, it is reasonably likely that thermocouple assembly 12 will be or will become fixed and bound to the inside wall of thermowell 14 such that the thermocouple assembly 12 and the thermowell assembly 14 are effectively an integral unit. Consequently, it is desirable for the thermocouple assembly to have the capability to accommodate and tolerate the expansion and contraction that the thermowell assembly cycles through. The thermocouple assembly can likely accommodate and tolerate the amount of bending and lateral displacement at the expansion joint that the thermowell is likely capable of accommodating and tolerating.

FIG. 11A is a perspective view of a thermocouple assembly 12a. Thermocouple assembly 12a is essentially identical to thermocouple assembly 12 and has the outer protective ceramic sheath 18, but thermocouple assembly 12a terminates at its proximal end with a wire receiver 12b. FIG. 11B is a perspective view of wire receiver 12b. Wire receiver 12b has a proximal end 12c and a distal end 12d. First and second drive rams 12e and 12f are located on the ends 12c and 12d, respectively. Thermocouple wires 16a and 16b pass through the drive rams 12e and 12f and are somewhat loose, not taut, between the drive rams, while in a normal, relaxed state. Wire receiver 12b has a tubular spool 12g extending between and threadedly engaged with first and second drive rams 12e and 12f. The threading will be fast pitched and designed so that a compressive force applied longitudinally through wire receiver 12b will cause spool 12g to rotate in one direction, thereby allowing the thermocouple assembly 12a to shorten in length and the thermocouple wires 16a and 16b to become looser or less taut between the first and second drive rams 12e and 12f. A tensile force on wire receiver 12b will cause spool 12g to rotate in an opposite direction, making the thermocouple wires 16a and 16b tighter or more nearly taut between the first and second drive rams 12e and 12f. A notched flange 12h preferably surrounds spool 12g about midway between the first and second drive rams 12e and 12f. The thermocouple wires 16a and 16b are received in the notches. A magnet can be located on the spool 12g or flange 12h, which can be used to indicate the rotative position of spool 12g, and is shown as mounted in one of the notches in the flange 12h. The drive flanges 12e and 12f do not rotate. The drive flanges have fast-pitch female threads, and the opposing ends of the spool have mating male threads. Wire receiver 12b is similar to a turnbuckle in construction, but operates differently in that a rotative force is applied to the equivalent spool portion of a turnbuckle for shortening or lengthening the turnbuckle, while the wire receiver 12*b* relies on compressive and tensile forces on the threaded connections to cause the spool to rotate.

Another aspect of the invention is the ability to measure the position of the thermocouple tip as it changes with expansion and compression. Tip position can be measured with magnet-based position indication using an electronic system such as a linear-slide potentiometer, a linear variable differential transformer (LVDT) sensor or an inductive linear sensor. The linear-slide potentiometer design is relatively simple and moderately accurate, but it may be necessary for internal wires to be passed from the pressured internal section through a wire seal to an electronic circuit for monitoring. The LVDT sensor is more complex, but it would be more accurate than the potentiometer. Three coils can be mounted on the thermowell tube wall outside of the pressure vessel, and it would not be necessary for wiring to pass through a pressure barrier. The inductive linear sensor is simpler than the LVDT, but would be less accurate. It would contain a single coil mounted on the external tube wall, and it would not be necessary for wiring to pass through a pressure barrier. All of these designs should provide repeatable measurements and can be connected to a microprocessor for remote monitoring and data recording, which would contribute to understanding the dynamics of refractory-vessel movement with temperature and other process changes.

A potentiometer with a linear axis of movement would be mounted internal to the thermowell. The potentiometer would be mounted at a section of the thermocouple-thermowell assembly that is fixed in position and will not move with the tip. A slider portion of the potentiometer would be connected to the section of the thermocouple-thermowell assembly that moves with the tip and would also be connected to the thermowell metal tube for a ground path. The potentiometer wire ends would be passed through an electrically insulated pressure barrier. The ratio of the resistances reading of each wire end to ground would be proportional to the position.

An inductive linear sensor is used to measure linear position. A single coil and a soft iron rod create the device. The inductance of the coil varies depending on the position of an end of the rod in the coil. The coil is attached to an oscillator, and the frequency of the oscillator is measured. The position of the rod can be detected through a nonmagnetic or low magnetic tube, such as nonmagnetic stainless steel, which can be used as a thermowell tube section. An example implementation would use an LC oscillator using the coil as the inductor. The frequency generated by the oscillator might range from 20 Khz to 100 Khz. The active electronics of the oscillator should be close to the coil, within inches or centimeters. The relationship between the rod position and the frequency is nonlinear. The position would be calculated from this value. The accuracy of the measurement would vary depending on where the end of the rod is in the device. Assuming a 3.3 V power supply is used, the output of the oscillator would be less than 3.3 V, and the current would be less than 10 mA. This allows the circuit to be intrinsically safe.

With reference to FIGS. 12A and 12B, an LVDT sensor 200 is used to measure the linear position of a thermocouple element 202. Three coils of wire 204*a*, 204*b* and 204*c* and a soft iron rod 206 create the sensor part of the device. LVDT sensor 200 detects the position of an end of rod 206 within the device. Middle coil 204*b* is excited with a sine wave. Signals from coils 204*a* and 204*c* on each side of the middle coil 204*b* are measured, and the position the end of rod 206 can be calculated from the measurements. The position of the rod 206 can be detected through a nonmagnetic or a low magnetic thermowell tube 208, which has a longer section outside of the mounting flange bushing 150 described in reference to FIGS. 10A and 10B. The thermocouple element 202 is received at its proximal end in a wire guide tube 210. Rod 206 has a longitudinal bore 206*a* and is received on and slides back and forth on the wire guide tube 210. Thermocouple element 202 is encased in a protective sheath 202*a*, which terminates at a proximal end 202*b*. A connector tube 212 has a distal end 212*a* attached to the proximal end 202*b* of the protective ceramic sheath 202*a*. Connector tube 212 has a proximal end 212*b*. A distal end 206*b* of the rod 206 is attached to the proximal end 212*b* of the connector tube 212. Connector tube 212 provides a physical attachment or connection between the rod 206 and the protective ceramic sheath 202*a*, which extends to the distal or hot end of the thermocouple assembly. Thus, longitudinal movement of the thermocouple assembly is indicated directly and literally by longitudinal movement of the rod 206 through the connector tube 210. FIG. 12A illustrates when the thermocouple assembly, which includes the protective sheath 202*a*, is in or has moved into the interior of the process vessel as far as possible. The thermocouple-thermowell assembly is as long as possible in FIG. 12A. This may indicate that the refractory has become hot and has expanded. FIG. 12B illustrates when the thermocouple-thermowell assembly has contracted as much as possible. The thermocouple-thermowell assembly is as short as the expansion joint allows in FIG. 12B. This may indicate that the refractory is cool or has cooled and is in its contracted state. The position measurement system for the thermocouple-thermowell assembly can be used to monitor the movement of refractory, without including a temperature measurement. The thermocouple assembly would not be needed, and the thermowell assembly could be replaced by rods or tubes connected together by an expansion joint such as described herein.

An example implementation of the LVDT sensor 200 in FIGS. 12A and 12B uses a 3.3V RMS sine wave to excite the primary coil 204*b*. The second ary coils 204*a* and 204*b* output no more than 3.3V RMS. The currents involved are small and less than 10 mA. This allows the circuit to be intrinsically safe. The active electronics can be more than 300 feet or 90 meters from the LVDT sensor 200. A measurement error of +/−0.5% of full scale is typical. A different implementation would allow the use of four wires, including a common wire and one additional wire for each coil. Using a shared common wire would result in smaller allowed distances between the sensor and the active electronics. An LVDT sensor is an absolute encoder. The measured position is accurate as soon as the device is powered on. There are additional linear encoder implementations that are incremental. Gear tooth encoders use a Hall effect sensor mounted on the external wall to detect the passing of a magnetic metallic rack. Linear optical encoders use an optical sensor and a linear scale to detect linear motion. An optical encoder may require wires to cross the pressure barrier. These sensors would require some method of determining initial position to use in this application.

Embodiments of the Invention

There are a number of possible embodiments of the present invention, and a few of the embodiments can be described as follows.

1. A thermowell tube assembly that can be installed at a desired depth within the interior of a process unit, the process unit having a mounting flange arranged and designed for coupling about an opening in the process unit, the mounting flange having an aperture therethrough, wherein the process unit is adapted to operate under pressure, and wherein the mounting flange is adapted to provide a seal about the opening for containing the pressure, the thermowell tube assembly comprising:

an internal tube coupled to an internal side of the aperture that provides an inner passage between the aperture and the internal tube;

female threads within the internal tube;

a thermowell tube having an external surface with male threads positioned thereon to engage the female threads of the internal tube, the thermowell tube having a bore creating an inlet, the bore arranged and designed to accept a thermocouple or other sensor assembly therein, wherein the male threads and the female threads are adapted such that rotation of the thermowell tube within the internal tube adjusts the position of the thermowell tube to the desired depth within the interior of the process unit;

a fastening mechanism that secures the thermowell tube to the mounting flange, the fastening mechanism arranged and designed to prevent rotational or longitudinal movement of the thermowell tube after the thermowell tube is threaded through the female threads of the internal tube to a desired position within the interior of the process unit, wherein the fastening mechanism is adapted to seal the thermowell tube to the mounting flange for containing the pressure in the process unit; and an expansion joint in the internal tube and/or in the thermowell tube. However, it is not necessary to include the elements for positioning the thermowell to a desired depth.

2. The assembly of embodiment 1, wherein the expansion joint comprises a bellows or a slip joint.

3. The assembly of embodiment 1, wherein the expansion joint comprises a slip joint, and wherein the slip joint has a noncircular cross-section, preferably a hexagonal cross-section.

4. The assembly of embodiment 1, wherein the expansion joint comprises a slip joint, wherein the thermowell tube comprises first and second portions, wherein the second portion slips over the first portion for providing the slip joint, wherein one of the first and second portions has a longitudinal slot and the other portion has a pin received in the slot, and wherein the slot and pin are sized and designed to provide desired limits for expansion and contraction, rotation and bending of the thermowell tube.

5. The assembly of embodiment 1, wherein the thermowell tube comprises a bellows.

6. The assembly of embodiment 1, wherein the thermowell tube comprises first and second portions and a bellows between the first and second portions, further comprising a support tube surrounding the bellows, wherein the support tube is fixed to the first portion and has a longitudinal slot for a pin-and-slot engagement with the second portion, thereby allowing the second portion to move with respect to the first portion through flexing of the bellows while limiting rotation and bending of the second portion with respect to the first portion through the bellows.

7. The assembly of any one of embodiments 1 to 6, wherein the expansion joint tends to compensate for lengthening and shortening of the thermowell tube due to changes in temperature in the process unit.

8. The assembly of any one of embodiments 1 to 7, wherein the expansion joint tends to compensate for flexing or bending of the thermowell tube.

9. The assembly of any one of embodiments 1 to 8, wherein the expansion joint tends not to allow rotation of the thermowell tube with respect to the mounting flange after installation.

10. The assembly of any one of embodiments 1 to 9, further comprising a thermocouple assembly disposed in the thermowell.

11. The assembly of any one of embodiments 1 to 9, further comprising a thermocouple assembly disposed in the thermowell, wherein the thermocouple assembly is coupled to the thermowell tube by a compression fitting.

12. The assembly of any one of embodiments 1 to 9, further comprising a sensor disposed in the thermowell, wherein the sensor is not a thermocouple.

13. The assembly of any one of embodiments 1 to 9, further comprising a sensor disposed in the thermowell, wherein the sensor is not a thermocouple, and wherein the sensor is coupled to the thermowell tube by a compression fitting.

14. The assembly of any one of embodiments 1 to 13, wherein the fastening mechanism is a compression fitting.

15. The assembly of any one of embodiments 1 to 13, wherein the fastening mechanism includes an external tube with threads to couple the external tube to the mounting flange and a cap to couple the thermowell tube to the external tube.

16. The assembly of any one of embodiments 1 to 15, wherein the female threads within the internal tube have a reverse thread pattern with respect to other thread patterns used in the assembly.

17. The assembly of any one of embodiments 1 to 16, wherein the process unit is a gasifier.

18. The assembly of any one of embodiments 1 to 16, wherein the process unit is a gasifier, and wherein the feedstock to the gasifier is coal or petroleum coke.

19. The assembly of any one of embodiments 1 to 9, further comprising a thermocouple assembly disposed in the thermowell, wherein the thermocouple assembly has a distal end for measuring temperature inside the process unit and a proximal end outside the process unit, wherein the thermocouple assembly comprises thermocouple wires extending through its length and a wire receiver located at the proximal end, wherein the thermocouple wires extend through, on or around the wire receiver, and wherein the wire receiver can expand and contract in length for accommodating and tolerating to some extent tensile and compressive forces on the wire receiver.

20. The assembly of embodiment 19, wherein the wire receiver comprises a central tube arranged coaxially with the thermocouple assembly and a drive ram threadedly engaged with each end of the central tube, wherein the threaded connections between the drive rams and the central tube are designed to allow the central tube to rotate in one direction due to a tensile force applied through the longitudinal axis of the wire receiver and to rotate in the opposite direction to compensate for a compressive force, thereby lengthening and shortening the wire receiver.

21. The assembly of any one of embodiments 1 to 20, further comprising a refractory brick or a material suitable for a high-temperature application disposed on the distal end of the thermowell tube.

22. A thermowell tube assembly that can be installed to extend into a process unit, the process unit having a mounting flange on a nozzle, the mounting flange having an opening for providing access into the process unit, the thermowell tube assembly comprising:

an internal tubular fitting for attachment to the mounting flange and extending into the process unit and thereby providing a first bore that is cooperatively arranged with the opening in the mounting flange for providing a passageway into the process unit;

a thermowell tube engaged with the internal tubular fitting, wherein the thermowell tube has a second bore cooperatively arranged with the first bore of the internal tubular fitting for receiving an elongate sensor assembly within the first and second bores; and an expansion joint in the internal tubular fitting and/or in the thermowell tube for allowing the thermowell tube to move with respect to the internal tubular fitting.

23. A thermowell tube assembly for protecting a thermocouple assembly that is used to measure temperature inside a commercial or industrial vessel, unit, structure or machine, which has a mounting structure for receiving and holding the thermowell tube assembly, the thermowell tube assembly comprising:

an internal tubular fitting for attachment to the mounting structure;

a thermowell tube engaged with the internal tubular fitting for receiving an elongate sensor assembly within the internal tubular fitting and the thermowell tube; and an expansion joint in the internal tubular fitting and/or in the thermowell tube for allowing the thermowell tube to move with respect to the internal tubular fitting.

24. A tubular assembly for protecting a sensor assembly that can be inserted inside a commercial or industrial vessel, unit, structure or machine, which has a mounting structure for receiving and holding the tubular assembly, the tubular assembly comprising:

a first tubular element for attachment to the mounting structure; and a second tubular element attached to the first tubular element, wherein each of the first and second tubular elements have a bore, wherein the first and second tubular elements are arranged so that an elongate sensor assembly can be received within the bores of the first and second elements; and a non-rigid joint in the first tubular element and/or in the second tubular element for allowing the second tubular element to move with respect to the first tubular element.

25. A thermowell tube assembly for protecting an elongate sensor assembly that is used to measure temperature inside a commercial or industrial vessel, unit, structure or machine, which has a mounting structure for receiving and holding the thermowell tube assembly, the thermowell tube assembly comprising:

an internal tubular fitting for attachment to the mounting structure;

a thermowell tube engaged with the internal tubular fitting for receiving the elongate sensor assembly within the internal tubular fitting and the thermowell tube; and an expansion joint in the internal tubular fitting and/or in the thermowell tube for allowing the thermowell tube to move with respect to the internal tubular fitting.

26. A thermowell tube assembly for protecting an elongate sensor assembly inside a refractory-lined vessel, which has a mounting flange for receiving and holding the thermowell tube assembly, the thermowell tube assembly comprising:

an internal tubular fitting for attachment to the mounting structure;

a thermowell tube engaged with the internal tubular fitting for receiving the elongate sensor assembly within the internal tubular fitting and the thermowell tube; and an expansion joint in the internal tubular fitting and/or in the thermowell tube for allowing the thermowell tube to move with respect to the internal tubular fitting.

27. A measurement assembly, comprising: the thermowell tube assembly of embodiment 25; and the elongate sensor assembly received in the internal tubular fitting and in the thermowell tube, wherein the elongate sensor assembly moves in conjunction with the thermowell tube; further comprising a position-sensor assembly located outside of the refractory-lined vessel, wherein the position-sensor assembly detects and indicates the position of the elongate sensor assembly.

28. A thermowell-thermocouple assembly that can be installed to extend into a refractory-lined process vessel, the process vessel having a mounting flange on a nozzle, the mounting flange having an opening for providing access into the process vessel, the thermowell-thermocouple assembly comprising:

an internal tubular fitting for attachment to the mounting flange and extending into the process vessel;

a thermowell tube having opposing proximal and distal ends, wherein the proximal end is slidingly engaged with the internal tubular fitting, thereby allowing the thermowell tube to move with respect to the internal tubular fitting;

a thermocouple assembly received within the internal tubular fitting and within the thermowell tube;

an expansion joint in the internal tubular fitting and/or in the thermowell tube for allowing the thermowell tube to move with respect to the internal tubular fitting; and a refractory brick having a bore hole, wherein the distal end of the thermowell tube is received in the bore hole, wherein 29. The thermowell-thermocouple assembly of embodiment 28, wherein the distal end of the thermowell tube can slide back and forth in the bore hole of the refractory brick.

30. The thermowell-thermocouple assembly of embodiment 28 or 29, wherein internal tubular has opposing proximal and distal ends, wherein the proximal end of the internal tubular fitting is attached to the mounting flange; further comprising a blowout prevention cap attached to the distal end of the internal tubular fitting, preferably further including stops in the internal tubular fitting for limiting the amount of movement of the thermowell tube with respect to the internal tubular fitting; and preferably further including second and third thermowell tubes received in bore holes in the refractory brick at different depths.

31. An elongate assembly for protecting a sensor assembly that can be inserted inside a commercial or industrial vessel, unit, structure or machine, which has a mounting structure for receiving and holding the elongate assembly, the elongate assembly comprising: (1) means for connecting the elongate assembly to the mounting structure; (2) means for protecting the sensor assembly; and (3) means for accommodating forces exerted on the elongate assembly, wherein the means for accommodating forces is a non-rigid connection between two portions of the elongate assembly or between the elongate assembly and the mounting structure.

32. An elongated sensor assembly comprising the elongate assembly of embodiment 31 and a sensor received within the elongate assembly.

While the preferred embodiments of the invention have been illustrated in detail, it is apparent that modifications and adaptations of the preferred embodiments will occur to those skilled in the art. Such modifications and adaptations are in the spirit and scope of the invention as set forth in the following claims:

What is claimed is:

1. A thermowell tube assembly for protecting a thermocouple assembly that is used to measure temperature inside a commercial or industrial vessel, unit, structure or machine, which has a mounting structure for receiving and holding the thermowell tube assembly, the thermowell tube assembly comprising:
   an internal tubular fitting for attachment to the mounting structure;
   a thermowell tube engaged with the internal tubular fitting for receiving the thermocouple assembly within the internal tubular fitting and the thermowell tube; and
   an expansion joint in the internal tubular fitting and/or in the thermowell tube, wherein the expansion joint is configured to allow the thermowell tube to move with respect to the internal tubular fitting while the commercial or industrial vessel, unit, structure or machine is in operation.

2. The assembly of claim 1, wherein the expansion joint comprises a bellows or a slip joint.

3. The assembly of claim 1, wherein the expansion joint comprises a slip joint, and wherein the slip joint has a noncircular cross-section.

4. The assembly of claim 1, wherein the expansion joint comprises a slip joint, wherein the thermowell tube comprises first and second portions, wherein the second portion slips over the first portion for providing the slip joint, wherein one of the first and second portions has a longitudinal slot and the other portion has a pin received in the slot for slideably connecting the first and second portions together, and wherein the slot and pin are sized and designed to provide desired limits for expansion and contraction, rotation and bending of the thermowell tube.

5. The assembly of claim 1, wherein the thermowell tube comprises a first tube in a threaded engagement with the internal tubular fitting and a second tube engaged with the first tube by a pin-and-slot engagement, wherein the first tube has a longitudinal slot, wherein the second tube has a pin extending through the slot, and wherein the pin-and-slot engagement is configured to allow the second tube to move axially with respect to the first tube.

6. The assembly of claim 5, further comprising a spring inside the first tube and a plunger received in the first and second tubes, wherein the pin is engaged with the plunger, and wherein the spring is configured to exert a force on the plunger directly or indirectly.

7. The assembly of claim 6, further comprising a stop inside the internal tubular fitting, wherein the spring abuts the stop, and wherein the plunger abuts the spring.

8. The assembly of any one of claims 1-7, wherein the internal tubular fitting has female threads, wherein the thermowell tube has an external surface and male threads on the external surface for engaging the female threads of the internal tubular fitting, wherein the male threads and the female threads are adapted such that rotation of the thermowell tube within the internal tubular fitting adjusts the position of the thermowell tube to a desired depth.

9. The assembly of claim 8, wherein the male threads are raised and extend radially from the external surface, wherein the internal tubular fitting has an inside diameter, wherein the external surface of the thermowell tube has an outside diameter that is less than the inside diameter of the internal tubular fitting, wherein the thermowell tube will pass through the internal tubular fitting but for the male threads on the thermowell tube threadedly engaging the female threads in the internal tubular fitting.

10. A thermowell-thermocouple assembly, comprising: the thermowell tube assembly of claim 8; and a thermocouple assembly received in the internal tubular fitting and in the thermowell tube.

11. The thermowell-thermocouple assembly of claim 10, wherein the thermocouple assembly is fastened to the inside of the thermowell tube, thereby connecting the thermocouple assembly to the thermowell tube.

12. The thermowell-thermocouple assembly of claim 11, wherein the thermocouple assembly moves in conjunction with the thermowell tube; further comprising a position-sensor assembly located outside of the commercial or industrial vessel, unit, structure or machine, wherein the position-sensor assembly detects and indicates the position of the thermocouple assembly.

13. A thermowell-thermocouple assembly, comprising: the thermowell tube assembly of any one of claims 1-7; and a thermocouple assembly received in the internal tubular fitting and in the thermowell tube.

14. A thermowell-thermocouple assembly, comprising: the thermowell tube assembly of claim 1; and a thermocouple assembly received in the internal tubular fitting and in the thermowell tube, wherein the thermocouple assembly is connected to the thermowell tube, wherein the thermocouple assembly moves in conjunction with the thermowell tube; further comprising a position-sensor assembly located outside of the commercial or industrial vessel, unit, structure or machine, wherein the position-sensor assembly detects and indicates the position of the thermocouple assembly.

15. The assembly of claim 1, wherein the thermowell tube comprises a first tube in a threaded engagement with the internal tubular fitting and a second tube engaged with the first tube by a pin-and-slot engagement, wherein the first tube has three longitudinal slots spaced apart around the circumference of the first tube, wherein the second tube has three pins for extending through the three slots, and wherein the pin-and-slot engagement is configured to allow the second tube to move axially with respect to the first tube.

16. The assembly of claim 1, wherein the thermowell tube comprises a first tube in a threaded engagement with the internal tubular fitting and a second tube engaged with the first tube, wherein the first tube has a longitudinal slot, wherein the second tube has a pin extending through the slot, wherein the second tube moves axially with respect to the first tube, and wherein there is no seal between the first and second tubes, thereby allowing pressure inside the thermowell tube to equilibrate with pressure outside of the thermowell tube.

17. A thermowell-thermocouple assembly, comprising: the thermowell tube assembly of claim 1; a thermocouple assembly received in the internal tubular fitting and in the thermowell tube, wherein the thermocouple assembly comprises thermocouple wires and a protective sheath surrounding the wires inside the commercial or industrial vessel, unit, structure or machine, wherein a length of the thermocouple wires is not surrounded by the protective sheath outside the commercial or industrial vessel, unit, structure or machine; and a thermocouple head located outside the commercial or industrial vessel, unit, structure or machine for receiving the thermocouple wires, wherein the thermocouple wires are crumpled and/or coiled proximal to the thermocouple head while the thermowell-thermocouple assembly is at ambient outside temperature for allowing the thermocouple assembly to expand in length.

18. A thermowell tube assembly for protecting a thermocouple assembly that is used to measure temperature inside a commercial or industrial vessel, unit, structure or machine, which has a mounting structure for receiving and holding the thermowell tube assembly, the thermowell tube assembly comprising:
an internal tubular fitting for attachment to the mounting structure; and
a thermowell tube engaged with the internal tubular fitting for receiving the thermocouple assembly within the internal tubular fitting and the thermowell tube,
wherein the thermowell tube comprises first and second portions and a bellows between the first and second portions, further comprising a support tube surrounding the bellows, wherein the support tube is fixed to the first portion and has a longitudinal slot for a pin-and-slot engagement with the second portion, thereby allowing the second portion to move with respect to the first portion through flexing of the bellows while limiting rotation and bending of the second portion with respect to the first portion through the bellows, or wherein the support tube is connected to each of the first and second portions by a pin-and-slot arrangement or by a pin engaged with an enlarged hole that allows longitudinal movement and limited rotational movement.

19. A thermowell-thermocouple assembly for extending into a process vessel having a refractory lining, the process vessel having a mounting flange on a nozzle, the mounting flange having an opening for providing access into the process vessel, the thermowell-thermocouple assembly comprising:
an internal tubular fitting for attachment to the mounting flange and extending into the process vessel;
a thermowell tube having a proximal portion and an opposing distal end, wherein the proximal portion is engaged with the internal tubular fitting, and wherein the thermowell tube is configured for the distal end to extend into the refractory lining;
a thermocouple assembly received within the internal tubular fitting and within the thermowell tube; and
an expansion joint in the internal tubular fitting and/or in the thermowell tube for allowing the thermowell tube to move with respect to the internal tubular fitting, wherein the thermowell-thermocouple assembly is configured to allow the distal end to be fixed with respect to the refractory lining and for the expansion joint to accommodate thermal expansion and contraction of the refractory lining.

20. The thermowell-thermocouple assembly of claim 19, further comprising a refractory brick, wherein the distal end of the thermowell tube is received in the refractory brick.

21. A method for installing a thermowell-thermocouple assembly in a process vessel that has a refractory lining that defines an inner surface of the process vessel, comprising:
obtaining the thermowell-thermocouple assembly of claim 19;
providing a bore that extends through the mounting flange, the nozzle and the refractory lining for receiving the thermowell-thermocouple assembly;
attaching the internal tubular fitting to the mounting flange; and
fixing the distal end of the thermowell tube to the refractory lining at or near the inner surface of the process vessel.

22. The method of claim 21, wherein the thermowell-thermocouple assembly has a length from where the internal tubular fitting attaches to the mounting flange to the distal end of the thermowell tube, wherein the expansion joint allows the length of the thermowell-thermocouple assembly to change while the process vessel is in operation.

23. The method of claim 22, further comprising a refractory brick having any desired shape, wherein the distal end of the thermowell tube is received in the refractory brick, and wherein the refractory brick is fixed to the refractory lining.

24. A tubular sensor assembly configured to be installed in and to extend into a refractory-lined process vessel, the process vessel having a mounting flange on a nozzle, the mounting flange having an opening for providing access into the process vessel, the tubular sensor assembly comprising:
an internal tubular fitting for attachment to the mounting flange and extending into the process vessel;
a tube engaged with the internal tubular fitting, wherein the internal tubular fitting and the tube comprise first and second portions;
a sensor assembly received within the internal tubular fitting and within the tube, wherein the sensor is for or is not for measuring temperature; and
an expansion joint connecting the first and second portions together, wherein the expansion joint allows the second portion to move with respect to the first portion while the process vessel is operated.

25. A tubular assembly configured to be installed in and to extend into a process vessel, the process vessel having a mounting flange, the mounting flange having an opening for providing access into the process vessel, the tubular assembly comprising:
an internal tubular fitting for attachment to the mounting flange and for extending into the process vessel;
a tube engaged with the internal tubular fitting for extending into the process vessel, wherein the internal tubular fitting and the tube comprise first and second portions; and
an expansion joint connecting the first and second portions together, wherein the first and second portions have longitudinal axes, and wherein the expansion joint is configured to allow the second portion to move with respect to the first portion such that the longitudinal axes of the first and second portions are not coaxial.

26. The tubular assembly of claim 25, further comprising a thermocouple assembly received in the internal tubular fitting and in the tube.

27. The tubular assembly of claim 25, wherein the expansion joint is configured to allow the second portion to move with respect to the first portion such that the longitudinal axes of the first and second portions are parallel and are not coaxial.

28. The tubular assembly of claim 27, further comprising a thermocouple assembly received in the internal tubular fitting and in the tube.

29. A tubular thermowell assembly configured to be installed in and to extend into a process vessel, the process vessel having a mounting flange, the mounting flange having an opening into the process vessel, the tubular assembly comprising:
an internal tubular fitting that can pass through the opening in the mounting flange and extend into and out of the process vessel;
a mounting fitting for surrounding and for a sliding engagement with the internal tubular fitting, wherein the mounting fitting is sized and designed to engage the mounting flange and the internal tubular fitting for connecting the internal tubular fitting to the mounting flange and for providing a seal between the internal tubular fitting and the mounting flange;

a thermowell tube having proximal and distal ends, wherein the proximal end is received in and trapped in a sliding engagement with the internal tubular fitting; and a refractory brick having a bore hole, wherein the distal end of the thermowell tube is received in the bore hole in the refractory brick.

30. The tubular thermowell assembly of claim 29, further comprising second and third thermowell tubes, wherein the three thermowell tubes are arranged in a common plane.

31. The tubular thermowell assembly of claim 29, further comprising a second thermowell tube, wherein each of the two thermowell tubes has a length that is different from the other thermowell tube.

32. The tubular thermowell assembly of claim 29, further comprising a thermocouple assembly received in the thermowell tube.

33. A thermowell assembly comprising:

a hollow tubular fitting having female threads;

a thermowell tube having a proximal portion, an opposing distal end, an outer surface and raised male threads on the outer surface in the proximal portion, wherein the distal end is passed through the hollow tubular fitting, wherein the raised male threads are engaged with the female threads thereby making a tubular assembly having a length, wherein the hollow tubular fitting and the thermowell tube comprise first and second longitudinal sections; and an expansion joint connecting the first and second longitudinal sections together, wherein the expansion joint, and the first and second longitudinal sections are configured to allow one to fix the position of the hollow tubular fitting and to push and pull on the distal end and thereby change the length of the tubular assembly.

34. A thermowell-thermocouple assembly comprising: the thermowell assembly of claim 33; and a thermocouple assembly received in the hollow tubular fitting and in the thermowell tube.

35. The thermowell-thermocouple assembly of claim 34, wherein the expansion joint is selected from the group consisting of unsupported bellows, supported bellows having a support sleeve surrounding a bellows, a sliding hexagonal coupling, a pin-and-slot coupling and a spring-loaded pin-and-slot sliding connection.

36. The thermowell-thermocouple assembly of claim 34, wherein each of the first and second longitudinal sections have a longitudinal axis, and wherein the expansion joint, and the first and second longitudinal sections are configured to allow one to move the distal end such that the axes of the first and second longitudinal sections are not coaxial.

37. The thermowell-thermocouple assembly of claim 34, wherein the expansion joint has two connection points, wherein each connection point allows a bending movement, and wherein the two connection points allow the tubular assembly to expand and to contract.

\* \* \* \* \*